United States Patent
Kitagawa et al.

(10) Patent No.: US 9,241,092 B2
(45) Date of Patent: *Jan. 19, 2016

(54) SIGNAL PROCESSING DEVICE, LIQUID CRYSTAL APPARATUS, ELECTRONIC EQUIPMENT, AND SIGNAL PROCESSING METHOD

(71) Applicant: Seiko Epson Corporation, Tokyo (JP)

(72) Inventors: Taku Kitagawa, Shiojiri (JP); Hiroyuki Hosaka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 355 days.

This patent is subject to a terminal disclaimer.

(21) Appl. No.: 13/794,195

(22) Filed: Mar. 11, 2013

(65) Prior Publication Data

US 2013/0242194 A1 Sep. 19, 2013

(30) Foreign Application Priority Data

Mar. 16, 2012 (JP) ................................. 2012-059884

(51) Int. Cl.
G09G 3/36 (2006.01)
H04N 5/14 (2006.01)

(52) U.S. Cl.
CPC ............... *H04N 5/14* (2013.01); *G09G 3/3648* (2013.01); *G09G 2320/0209* (2013.01); *G09G 2320/0271* (2013.01); *G09G 2340/00* (2013.01)

(58) Field of Classification Search
CPC . G09G 3/3648; G09G 3/3688; G09G 3/3677; G09G 2320/0209; G09G 2300/0426; G09G 2310/0278; G02B 27/20
See application file for complete search history.

(56) References Cited

U.S. PATENT DOCUMENTS

| | | | |
|---|---|---|---|
| 8,242,991 B2* | 8/2012 | Kato et al. | ....................... 345/87 |
| 8,466,866 B2 | 6/2013 | Iisaka et al. | |
| 2008/0018630 A1 | 1/2008 | Fujino | |
| 2009/0243983 A1 | 10/2009 | Ohashi et al. | |
| 2010/0207934 A1 | 8/2010 | Kato et al. | |
| 2011/0051006 A1 | 3/2011 | Iisaka et al. | |
| 2011/0051007 A1 | 3/2011 | Hosaka et al. | |
| 2011/0109815 A1 | 5/2011 | Hosaka et al. | |
| 2011/0176071 A1 | 7/2011 | Iisaka et al. | |
| 2011/0181795 A1 | 7/2011 | Hosaka et al. | |
| 2011/0205207 A1 | 8/2011 | Hosaka et al. | |
| 2011/0205208 A1 | 8/2011 | Iisaka et al. | |
| 2011/0205439 A1 | 8/2011 | Iisaka et al. | |

(Continued)

FOREIGN PATENT DOCUMENTS

JP 2008-046613 A 2/2008
JP 2008-281947 A 11/2008

(Continued)

*Primary Examiner* — Abbas Abdulselam
(74) *Attorney, Agent, or Firm* — ALG Intellectual Property, LLC

(57) ABSTRACT

A signal processing device which is used in a liquid crystal apparatus, includes a detection portion that detects a boundary between a first pixel correlated with a first signal for applying a first voltage lower than a first reference voltage and a second pixel correlated with a second signal for applying a second voltage higher than a second reference voltage on the basis of signals for controlling voltages applied to pixels, and a correction portion that corrects a signal correlated with M pixels including the first pixel to a third signal for applying a third voltage which is higher than the first voltage and lower than the second voltage in a correction period, wherein the correction portion varies M in the correction period.

17 Claims, 25 Drawing Sheets

(56) References Cited

U.S. PATENT DOCUMENTS

| | | |
|---|---|---|
| 2011/0205440 A1 | 8/2011 | Hosaka et al. |
| 2011/0205452 A1 | 8/2011 | Hosaka et al. |
| 2011/0205479 A1 | 8/2011 | Hosaka et al. |
| 2012/0147272 A1 | 6/2012 | Hosaka et al. |
| 2013/0242194 A1* | 9/2013 | Kitagawa et al. ............. 348/571 |

FOREIGN PATENT DOCUMENTS

| | | |
|---|---|---|
| JP | 2009-237366 A | 10/2009 |
| JP | 2010-191157 A | 9/2010 |
| JP | 2011-053390 A | 3/2011 |
| JP | 2011-053417 A | 3/2011 |
| JP | 2011-150223 A | 5/2011 |
| JP | 2011-107174 A | 6/2011 |
| JP | 2011-107497 A | 6/2011 |
| JP | 2011-145501 A | 7/2011 |
| JP | 201 -170235 A | 9/2011 |
| JP | 2011-170236 A | 9/2011 |
| JP | 2011-175136 A | 9/2011 |
| JP | 2011-175137 A | 9/2011 |
| JP | 2011-175199 A | 9/2011 |
| JP | 2011-175200 A | 9/2011 |
| JP | 2012-113226 A | 6/2012 |
| JP | 2012-127991 A | 7/2012 |
| JP | 2012-155212 A | 8/2012 |
| JP | 2012-168229 A | 9/2012 |
| JP | 2012-242797 A | 12/2012 |
| JP | 2012-242798 A | 12/2012 |
| WO | WO-2012-101990 A | 8/2012 |

* cited by examiner

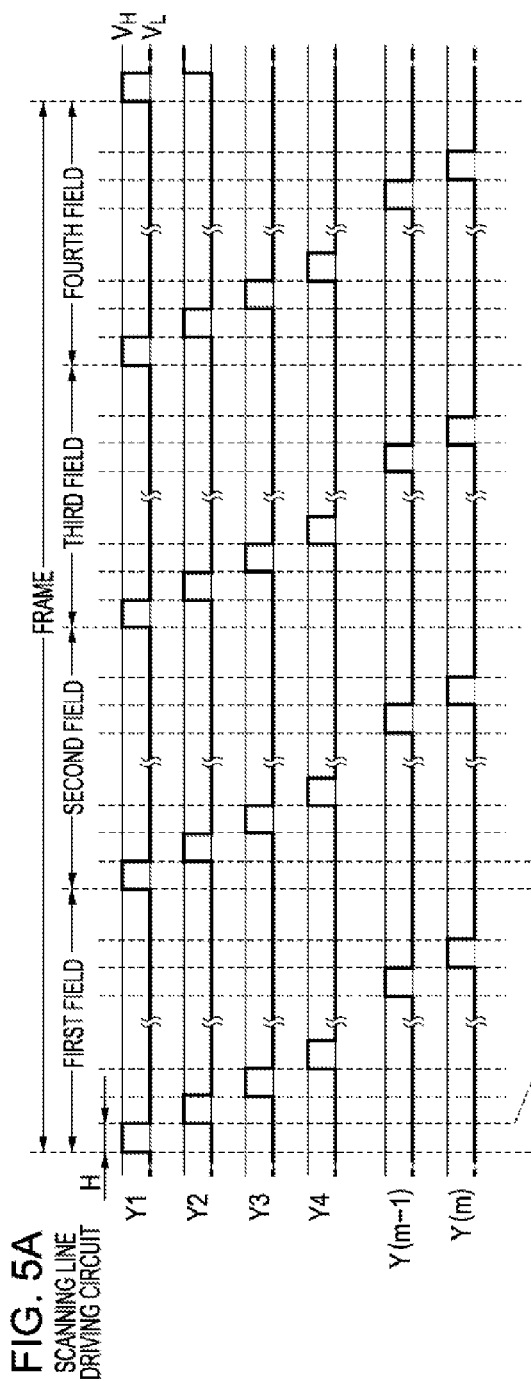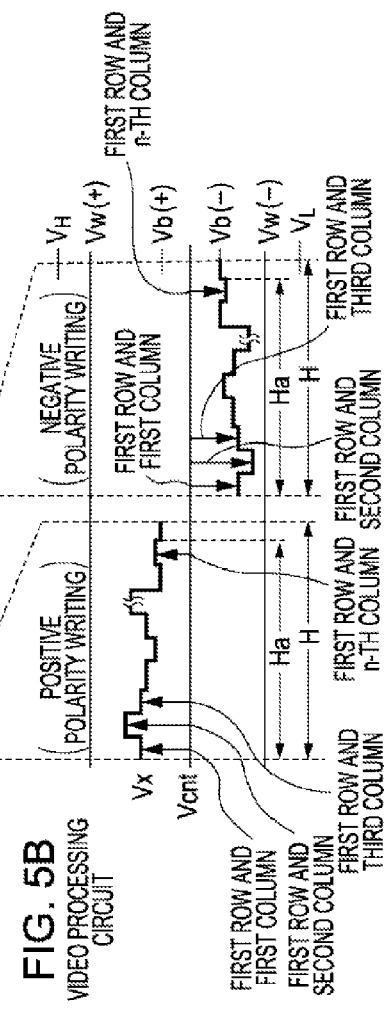

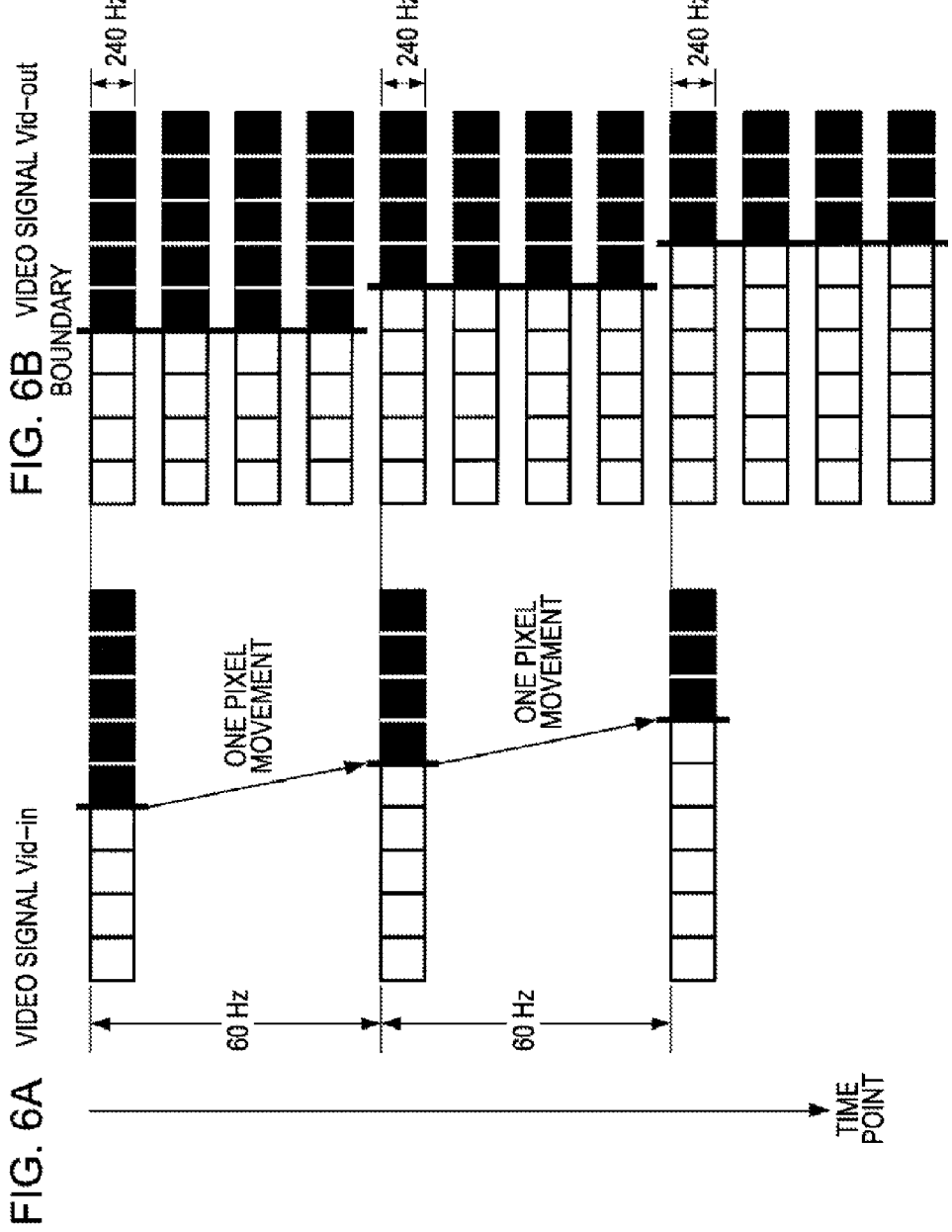

VIDEO SIGNAL (PREVIOUS FRAME)

VIDEO SIGNAL (CURRENT FRAME)

BOUNDARY COMPARISON
BOUNDARY (PREVIOUS FRAME)
BOUNDARY (CURRENT FRAME)

APPLIED BOUNDARY DETECTION

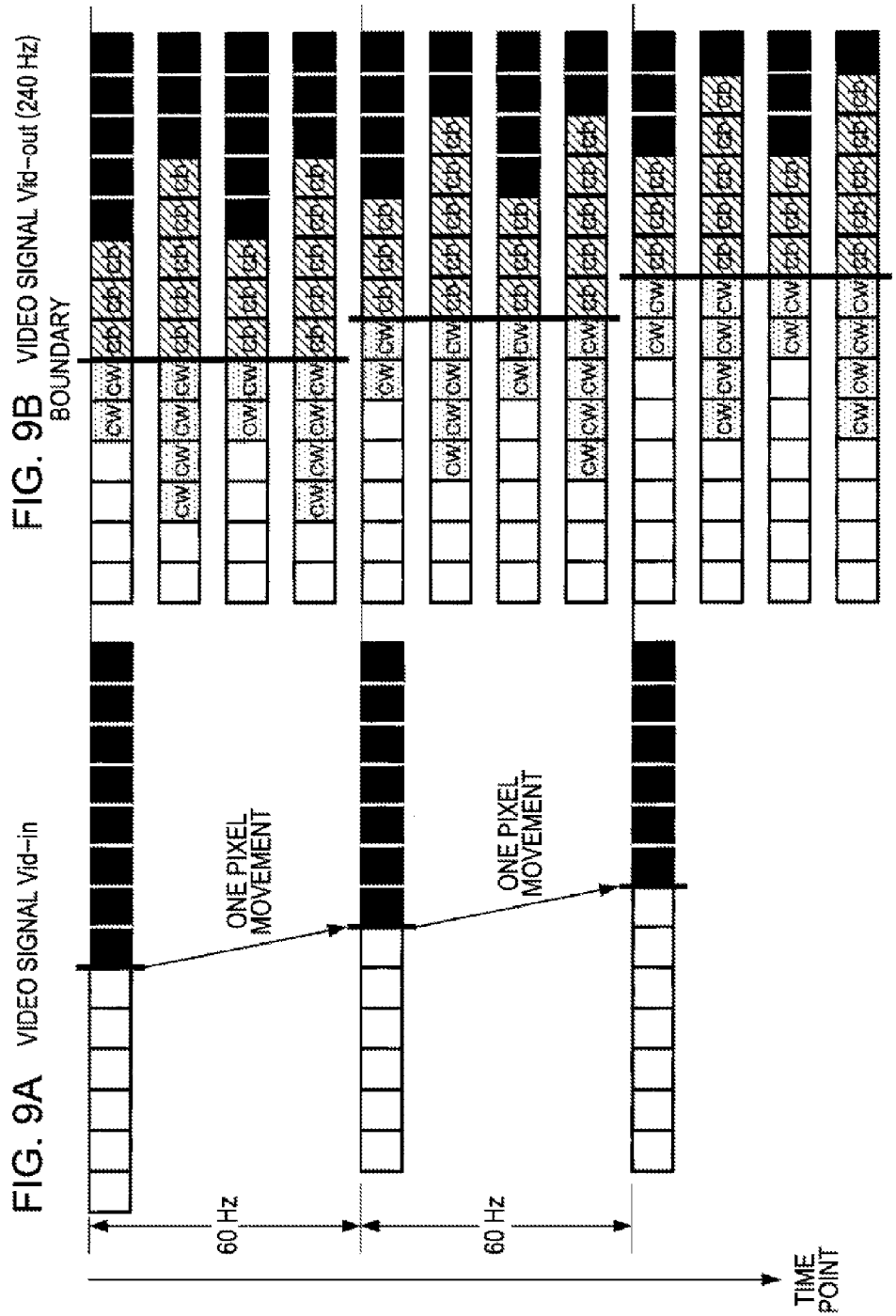

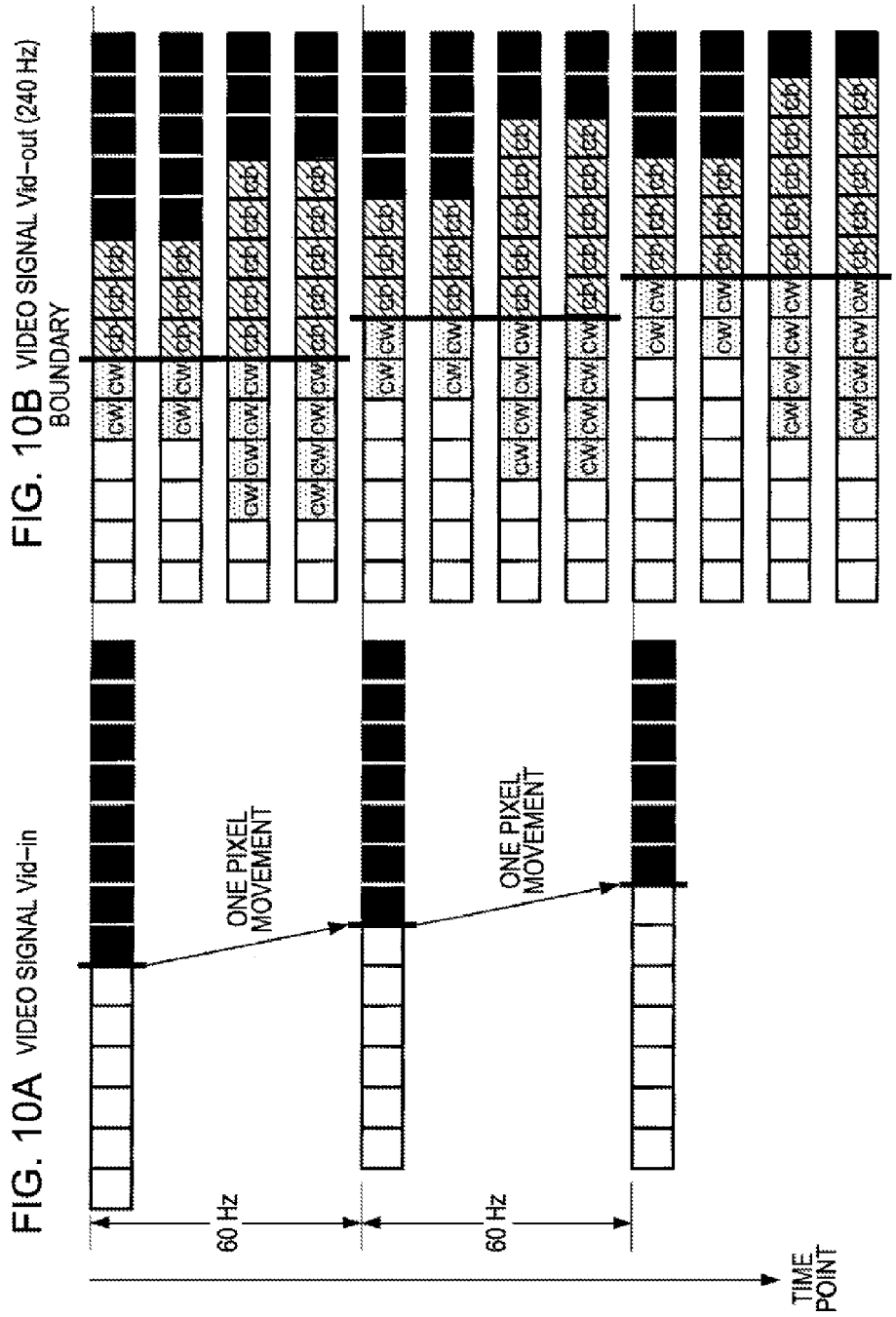

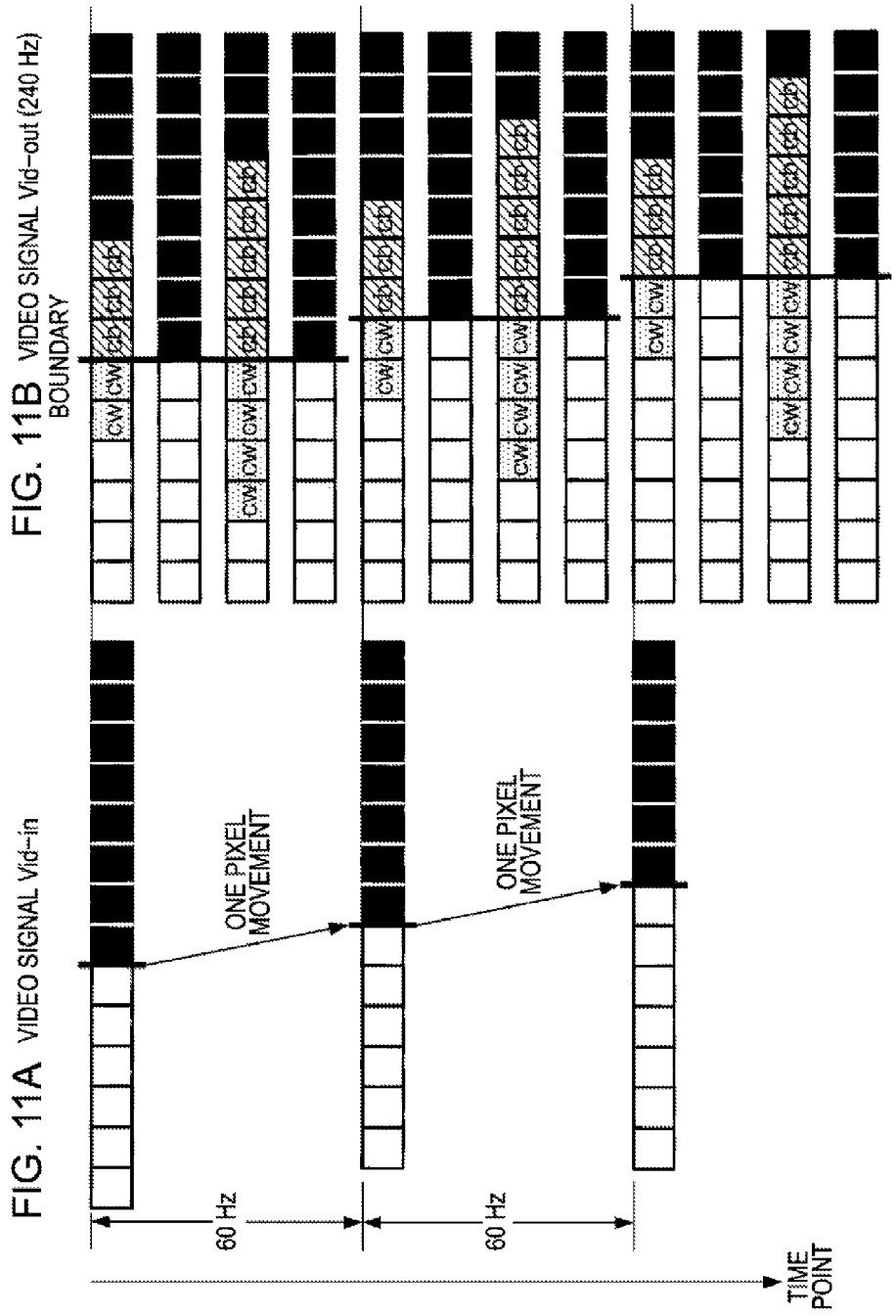

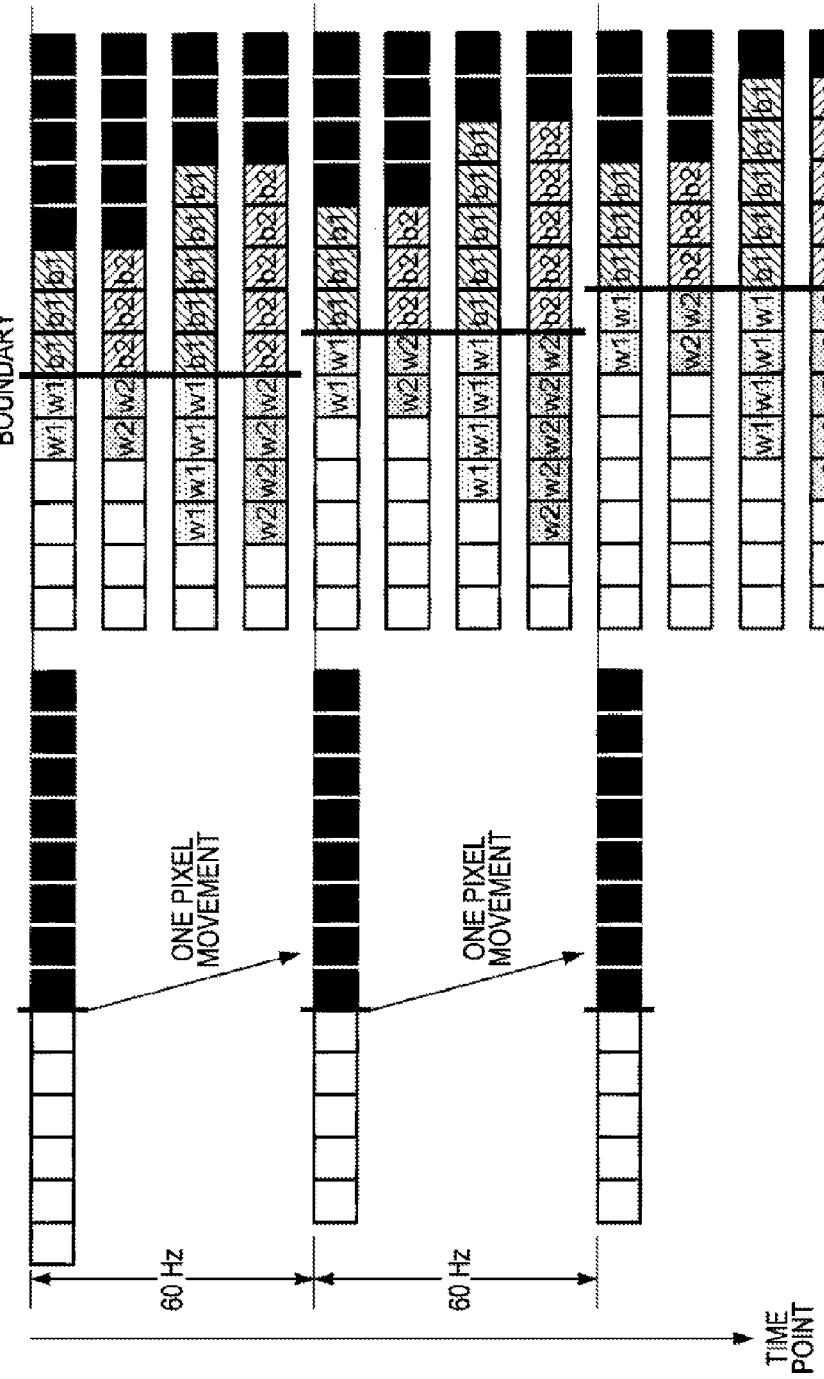
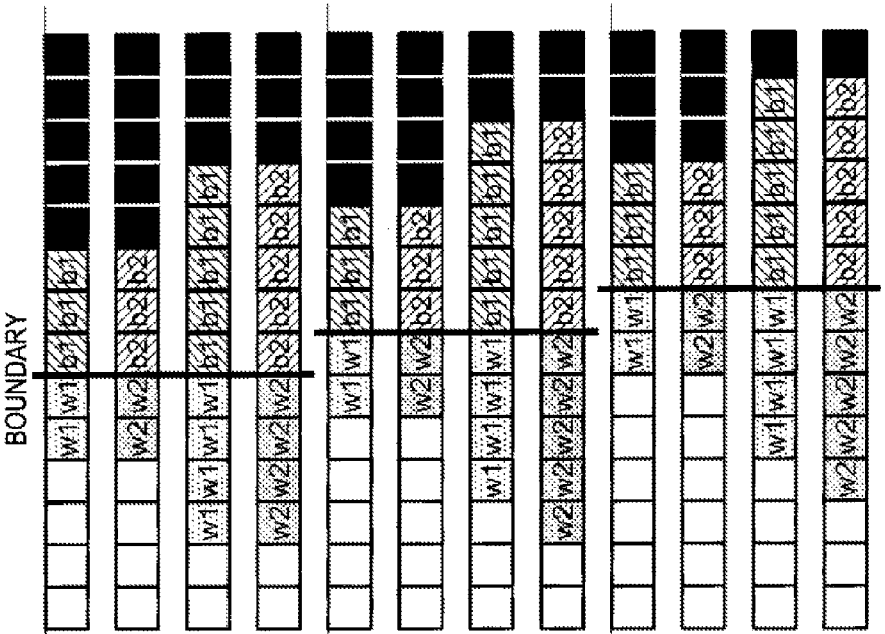
FIG. 12A VIDEO SIGNAL Vid-in
FIG. 12B VIDEO SIGNAL Vid-out (240 Hz)

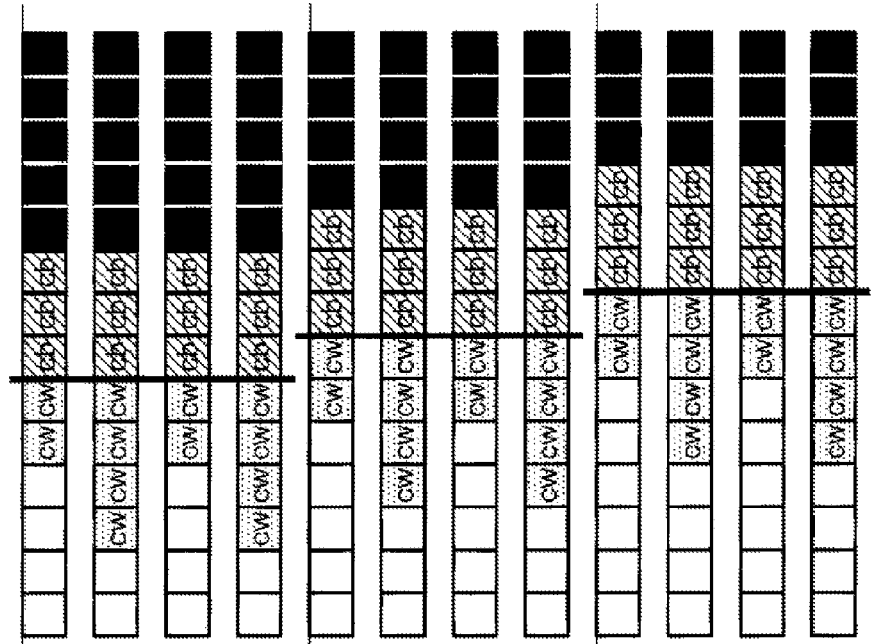
FIG. 13B VIDEO SIGNAL Vid-out (240 Hz)
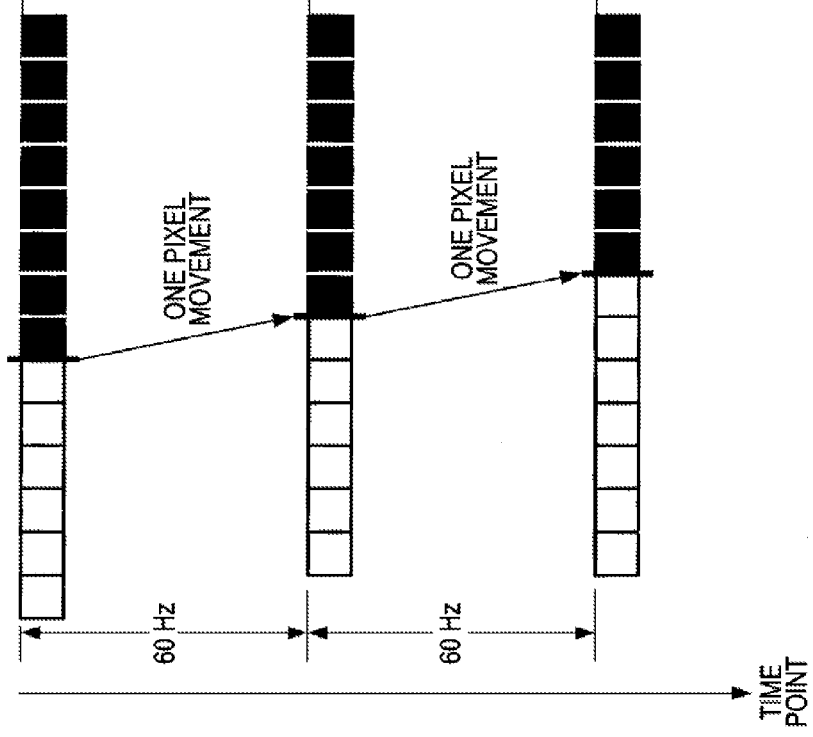
FIG. 13A VIDEO SIGNAL Vid-in

RISK BOUNDARY DETECTION

RISK BOUNDARY + APPLIED BOUNDARY DETECTION

RISK BOUNDARY DETECTION
($\theta b = 225$ DEGREES)

RISK BOUNDARY DETECTION
($\theta b = 90$ DEGREES)

RISK BOUNDARY + APPLIED BOUNDARY DETECTION
($\theta b = 225$ DEGREES)

RISK BOUNDARY + APPLIED BOUNDARY DETECTION
($\theta b = 90$ DEGREES)

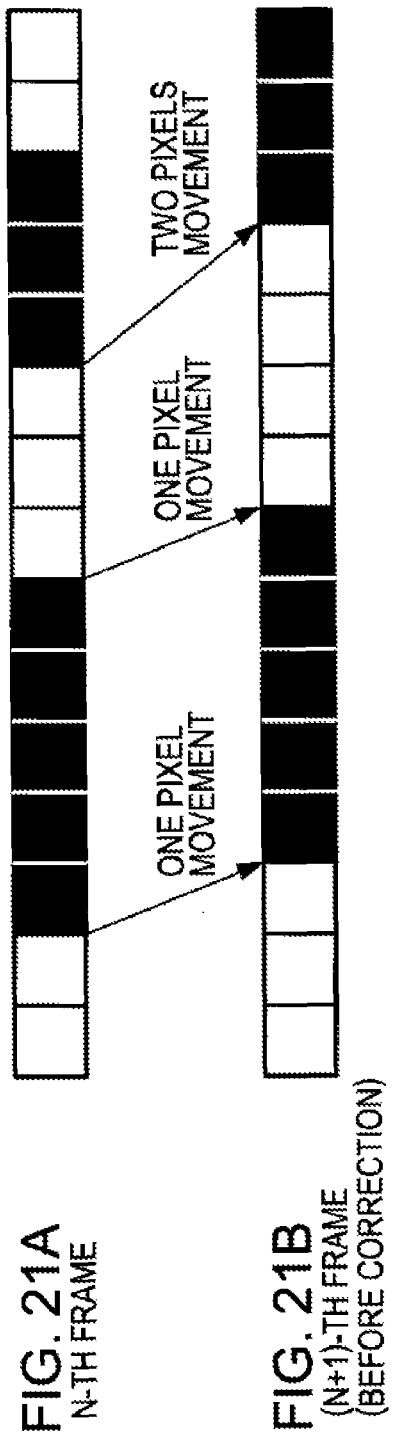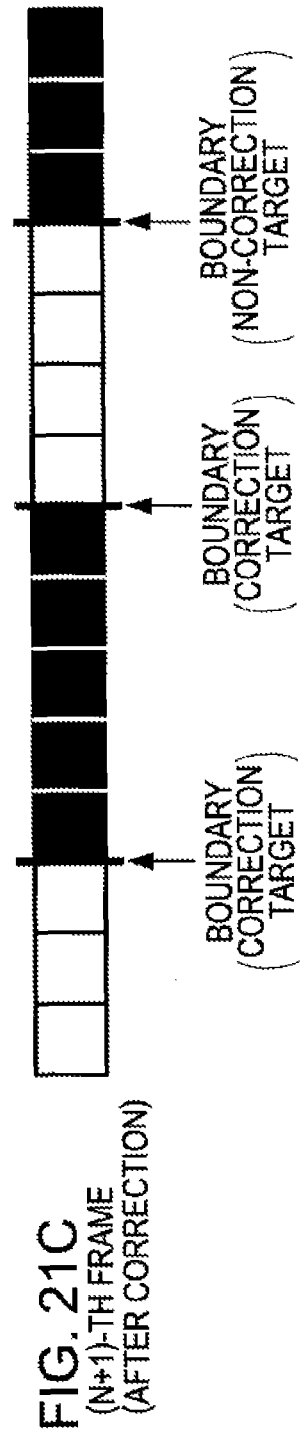
FIG. 21A N-TH FRAME
FIG. 21B (N+1)-TH FRAME (BEFORE CORRECTION)
FIG. 21C (N+1)-TH FRAME (AFTER CORRECTION)

SIGNAL PROCESSING DEVICE, LIQUID CRYSTAL APPARATUS, ELECTRONIC EQUIPMENT, AND SIGNAL PROCESSING METHOD

BACKGROUND

1. Technical Field

The present invention relates to a technique capable of reducing display defects in a liquid crystal panel.

2. Related Art

A liquid crystal panel has a configuration in which liquid crystal is interposed between a pixel electrode provided for each pixel and a common electrode provided so as to be common to a plurality of pixels. In this liquid crystal panel, there are cases where poor liquid crystal alignment (reverse tilt domain) occurs due to a transverse electric field generated between pixel electrodes adjacent to each other, thereby causing display defects. Techniques for suppressing display defects from occurring due to the poor liquid crystal alignment are disclosed in JP-A-2009-237366 and JP-A-2010-191157. JP-A-2009-237366 and JP-A-2010-191157 disclose a technique for reducing a transverse electric field occurring in a pixel in which poor image quality tends to occur due to a deposition direction of a liquid crystal alignment (inorganic alignment layer) among pixels to which a strong transverse electric field is applied.

However, in a case of an image line in which a dark pixel group including a plurality of continuous dark pixels and a bright pixel group including a plurality of continuous bright pixels are adjacent to each other, when a dark pixel adjacent to a boundary is set as a correction pixel, a transverse electric field generated between the dark pixel and a bright pixel adjacent thereto is reduced, but a transverse electric field generated between the dark pixel and a dark pixel (that is, a non-correction pixel) on an opposite side to the bright pixel is strengthened further than before, and thus there is a possibility that a reverse tilt domain may occur in this part. Similarly, when a bright pixel adjacent to a boundary is set as a correction pixel, a transverse electric field generated between the bright pixel and a dark pixel adjacent thereto is reduced, but a transverse electric field generated between the bright pixel and a bright pixel (that is, a non-correction pixel) on an opposite side to the dark pixel is strengthened further than before, and thus there is a possibility that a reverse tilt domain may occur in this part. As such, the correction of a video signal for correcting a reverse tilt domain causes a reverse tilt domain to be generated in other parts.

SUMMARY

An advantage of some aspects of the invention is to suppress a reverse tilt domain from being generated in a non-correction pixel due to correction for reducing a reverse tilt domain.

According to a first aspect of the invention, there is provided a signal processing device which is used in a liquid crystal apparatus including a plurality of pixels, including a detection portion that detects a boundary between a first pixel correlated with a first signal for applying a first voltage lower than a first reference voltage and a second pixel correlated with a second signal for applying a second voltage higher than a second reference voltage on the basis of a signal for controlling a voltage applied to each of the plurality of pixels; and a correction portion that corrects a signal correlated with M (where M is an integer equal to or more than 1) pixels including the first pixel to a third signal for applying a third voltage which is higher than the first voltage and lower than the second voltage in a correction period, wherein the correction portion varies M in the correction period.

According to the invention, it is possible to suppress a reverse tilt domain from being generated in a non-correction pixel due to correction for reducing a reverse tilt domain.

According to a second aspect of the invention, a signal processing device which is used in a liquid crystal apparatus including a plurality of pixels, including a detection portion that detects a boundary between a first pixel correlated with a first signal for applying a first voltage lower than a first reference voltage and a second pixel correlated with a second signal for applying a second voltage higher than a second reference voltage on the basis of a signal for controlling a voltage applied to each of the plurality of pixels; and a correction portion that corrects a signal correlated with N (where N is an integer equal to or more than 1) pixels including the second pixel to a fourth signal for applying a fourth voltage which is higher than the first voltage and lower than the second voltage in a correction period, wherein the correction portion varies N in the correction period.

According to the invention, it is possible to suppress a reverse tilt domain from being generated in a non-correction pixel due to correction for reducing a reverse tilt domain.

In the invention, the correction portion may correct a video signal designating an applied voltage to a liquid crystal element corresponding to the first pixel, which is lower than a fifth voltage lower than the first voltage, among N (where N is an integer equal to or more than 1) pixels which are continuously located from the first pixel adjacent to a boundary detected by the detection portion in an opposite direction to the boundary, to a video signal designating a sixth voltage higher than the fifth voltage in a correction period which is at least a portion of a display period corresponding to the video signal by varying N in the correction period.

According to the invention, it is possible to suppress correction of a video signal per pixel and to suppress a reverse tilt domain from being generated in a non-correction pixel.

In the invention, the correction portion may vary M by two or more from before a variation.

According to the invention, it is possible to make a reverse tilt domain hard to be generated in a non-correction pixel as compared with a case where M is varied by one from before a variation.

In the invention, the correction portion may vary N by two or more from before a variation.

According to the invention, it is possible to make a reverse tilt domain hard to be generated in a non-correction pixel as compared with a case where N is varied by one from before a variation.

In addition, the invention is not limited to the signal processing device and is applicable to a liquid crystal apparatus, electronic equipment, and a signal processing method.

BRIEF DESCRIPTION OF THE DRAWINGS

The invention will be described with reference to the accompanying drawings, wherein like numbers reference like elements.

FIGS. 5A and 5B are diagrams illustrating a display operation in the same liquid crystal panel.

FIGS. 6A and 6B are diagrams illustrating a relationship between input and output video signals at quadruple normal speed driving.

FIGS. 9A and 9B are diagrams illustrating a correction process in the same video processing circuit.

FIGS. 10A and 10B are diagrams illustrating another correction process in the same video processing circuit.

FIGS. 11A and 11B are diagrams illustrating another correction process in the same video processing circuit.

FIGS. 12A and 12B are diagrams illustrating another correction process in the same video processing circuit.

FIGS. 13A and 13B are diagrams illustrating another correction process in the same video processing circuit.

FIGS. 21A to 21C are diagrams illustrating a correction process in a video processing circuit according to a third embodiment.

DESCRIPTION OF EXEMPLARY EMBODIMENTS

Hereinafter, embodiments of the invention will be described with reference to the drawings.

First Embodiment

First, a description will be made of the first embodiment of the invention.

Figure 1:
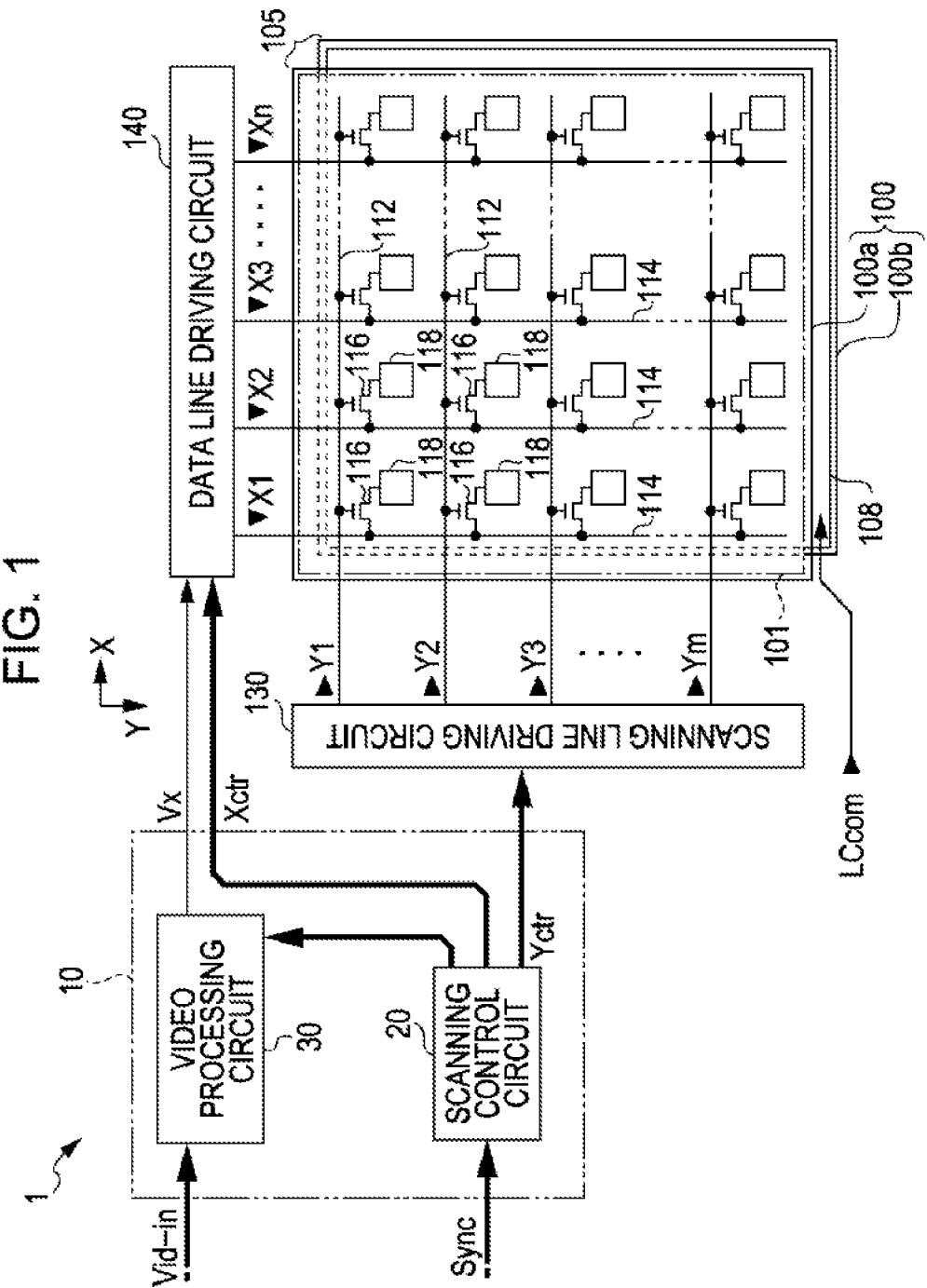
FIG. 1 is a diagram illustrating a liquid crystal display apparatus which employs a video processing circuit (signal processing device) according to a first embodiment of the invention.

FIG. 1 is a block diagram illustrating an entire configuration of a liquid crystal display apparatus 1 which employs a video processing circuit according to the present embodiment.

As shown in FIG. 1, the liquid crystal display apparatus 1 includes a control circuit 10, a liquid crystal panel 100, a scanning line driving circuit 130, and a data line driving circuit 140. A video signal Vid-in is supplied to the control circuit 10 from a high rank device in synchronization with synchronization signals Sync. The video signal Vid-in is digital data which designates a grayscale level of each pixel of the liquid crystal panel 100, and is supplied in order of scanning according to a vertical scanning signal, a horizontal scanning signal, and a dot clock signal (neither shown) included in the synchronization signals Sync. In the present embodiment, a frequency at which the video signals Vid-in are supplied is 60 Hz, and the video signals Vid-in for displaying an image of one frame (one scene) are supplied at a cycle 16.67 milliseconds which is a reciprocal of 60 Hz.

In addition, the video signal Vid-in designates a grayscale level, but an applied voltage to a liquid crystal element is defined according to the grayscale level, and thus the video signal Vid-in may designate an applied voltage to the liquid crystal element. In the following description, it is assumed that the higher the grayscale level of a video signal, the larger the applied voltage designated for a liquid crystal element.

The control circuit 10 includes a scanning control circuit 20 and a video processing circuit 30. The scanning control circuit 20 generates various control signals and controls the respective parts in synchronization with the synchronization signals Sync. The video processing circuit 30 will be described later in detail, and processes a digital video signal Vid-in and outputs an analog data signal Vx.

The liquid crystal panel 100 has a configuration in which an element substrate (first substrate) 100a and an opposite substrate (second substrate) 100b are joined to each other with a specific gap, and liquid crystal 105 which is driven by an electric field in the longitudinal direction is interposed in the gap. The element substrate 100a is provided with a plurality of scanning lines 112 of m rows in the X (transverse) direction, and a plurality of data lines 114 of n columns in the Y (longitudinal) direction so as to be electrically insulated from the respective scanning lines 112 in an opposite surface to the opposite substrate 100b.

In addition, in this embodiment, in order to differentiate the scanning lines 112 from each other, the scanning lines are referred to as scanning lines of first, second, third, . . . , (m−1)-th, and m-th rows in order from the top in some cases. Similarly, in order to differentiate the data lines 114 from each other, the data lines are referred to as data lines of first, second, third, . . . , (n−1)-th, and n-th columns in order from the left in some cases.

In the element substrate 100a, a set of an n cannel type TFT 116 and a rectangular transparent pixel electrode 118 is provided so as to correspond to each of intersections of the scanning lines 112 and the data lines 114. A gate electrode of the TFT 116 is connected to the scanning line 112, a source electrode thereof is connected to the data line 114, and a drain electrode thereof is connected to the pixel electrode 118. On the other hand, the opposite substrate 100b is provided with a transparent common electrode 108 on an entire surface in an opposite surface to the element substrate 100a. A voltage LCcom is applied to the common electrode 108 by a circuit (not shown).

In addition, in FIG. 1, since the opposite surface of the element substrate 100a is a back side of the figure, the scanning lines 112, the data lines 114, the TFTs 116, and the pixel electrodes 118 provided on the opposite surface are indicated by broken lines but are difficult to observe, and are thus indicated by the solid lines, respectively.

Figure 2:
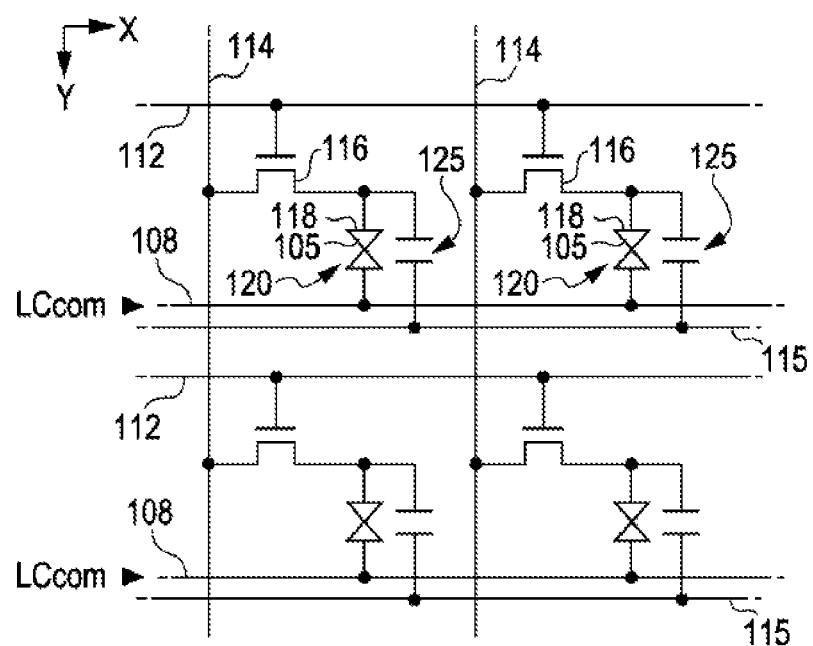
FIG. 2 is a diagram illustrating an equivalent circuit of a liquid crystal element in the same liquid crystal display apparatus.

FIG. 2 is a diagram illustrating an equivalent circuit of the liquid crystal panel 100.

As shown in FIG. 2, the liquid crystal panel 100 has a configuration in which liquid crystal elements 120 where the liquid crystal 105 is interposed between the pixel electrode 118 and the common electrode 108 are arranged so as to correspond to the intersections of the scanning lines 112 and the data lines 114. Although not shown in FIG. 1, in the equivalent circuit of the liquid crystal panel 100, as shown in FIG. 2, auxiliary capacitors (storage capacitors) 125 are practically provided in parallel to the liquid crystal elements 120. One end of each of the auxiliary capacitors 125 is connected to the pixel electrode 118 and the other end thereof is connected in common to a capacitance line 115. The capacitance line 115 is maintained at a constant voltage over time.

Here, when the scanning line 112 is turned to an H level, the TFT 116 of which the gate electrode is connected to the scanning line is turned on, and thus the pixel electrode 118 is connected to the data line 114. Therefore, when the scanning line 112 is in an H level, a data signal with a voltage corresponding to a grayscale is supplied to the data line 114, and thus the data signal is applied to the pixel electrode 118 via the turned-on TFT 116. When the scanning line 112 is turned to an L level, the TFT 116 is turned off, but the voltage applied to the pixel electrode 118 is maintained by the capacitive characteristics of the liquid crystal element 120 and the auxiliary capacitor 125.

A molecular alignment state of the liquid crystal 105 varies depending on an electric field generated by the pixel electrode 118 and the common electrode 108 in the liquid crystal element 120. For this reason, if the liquid crystal element 120 is of a transmissive type, a transmittance corresponding to an applied and maintained voltage is shown. In the liquid crystal panel 100, a transmittance varies for each liquid crystal element 120, and thus the liquid crystal element 120 corresponds to a pixel. In addition, a region where the pixels are arranged is a display region 101.

Further, in the present embodiment, the liquid crystal 105 is of a VA type, and the liquid crystal element 120 is set in a normally black mode in which a black state happens when a voltage is not applied.

Referring to FIG. 1 again, the scanning line driving circuit 130 supplies scanning signals Y1, Y2, Y3, . . . , and Ym to the scanning lines 112 of the first, second, third, . . . , and m-th rows in response to a control signal Yctr from the scanning control circuit 20. Specifically, as shown in FIG. 5A, the scanning line driving circuit 130 selects the scanning lines 112 in order of the first, second, third, . . . , (m−1)-th, and m-th rows during a frame, sets a scanning signal to the selected scanning line to a selection voltage $V_H$ (H level), and sets scanning signals to the other scanning lines to a non-selection voltage $V_L$ (L level).

In addition, the frame refers to a period required to display one scene of an image on the liquid crystal panel 100 by driving the liquid crystal panel 100. In the present embodiment, the frequency of the vertical scanning signal controlled by the synchronization signal Sync is 240 Hz. As shown in FIG. 5A, in the liquid crystal display apparatus 1, one frame is divided into four fields including first to fourth fields, and the scanning lines of the first to m-th rows are scanned in each field, thereby realizing so-called quadruple speed driving. In other words, the liquid crystal display apparatus 1 drives the liquid crystal panel 100 at driving speed of 240 Hz based on the video signal Vid-in which is supplied at supply speed of 60 Hz from the high rank device and thus displays an image of one frame based on the video signal Vid-in. A period of one field corresponds to a ¼ frame period and is about 4.16 milliseconds here. In addition, as shown in FIG. 5B, in the liquid crystal display apparatus 1, positive writing is designated in the first and third fields and negative writing is designated in the second and fourth fields such that a writing polarity is reversed for each filed, thereby writing data in the pixels.

The data line driving circuit 140 samples a data signal Vx supplied from the video processing circuit 30 in the data lines 114 of the first to n-th columns in response to the control signal Xctr from the scanning control circuit 20 as data signals X1 to Xn.

In addition, in this description, in relation to a voltage, a ground potential is used as voltage zero unless particularly mentioned except for an applied voltage to the liquid crystal element 120. The applied voltage to the liquid crystal element 120 is a potential difference between the voltage LCcom of the common electrode 108 and a voltage of the pixel electrode 118 and is used to be differentiated from other voltages.

Figure 4A:
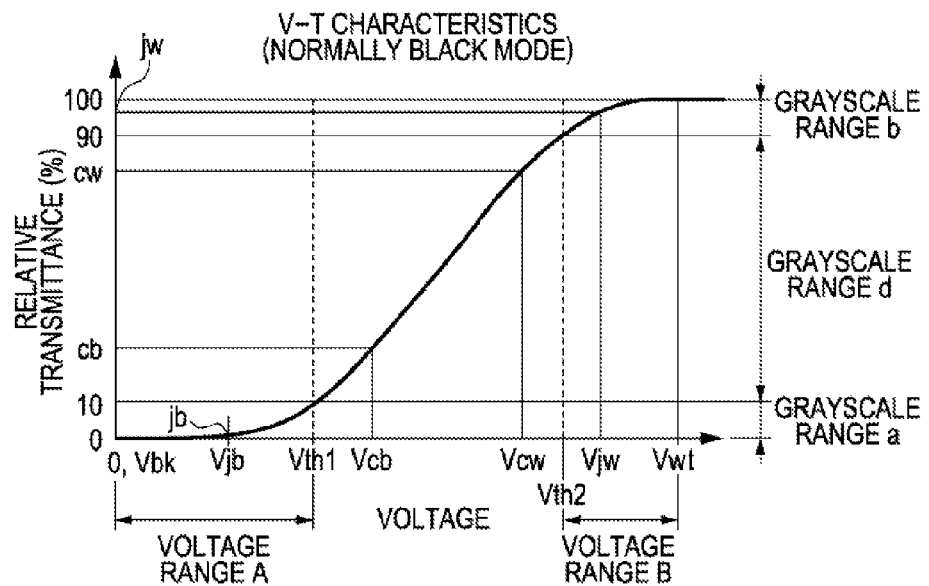
FIGS. 4A and 4B are diagrams illustrating V-T characteristics of a liquid crystal panel forming the same liquid crystal display apparatus.

Meanwhile, a relationship between an applied voltage to the liquid crystal element 120 and the transmittance is expressed by the V-T characteristics, for example, as shown in FIG. 4A, in the normally black mode. For this reason, in order to make the liquid crystal element 120 represent a transmittance corresponding to a grayscale level designated by the video signal Vid-in, a voltage corresponding to the grayscale level may be applied to the liquid crystal element 120. However, if an applied voltage to the liquid crystal element 120 is merely regulated according to a grayscale level designated by the video signal Vid-in, there are cases where display defects occur due to a reverse tilt domain.

An example of the display defects due to the reverse tilt domain will be described. For example, as shown in FIG. 27, in a case where a black pattern in which black pixels are continuously located is moved to the right by one pixel for each frame as a background of white pixels in an image represented by the video signal Vid-in, a pixel which is to be varied from the black pixel to the white pixel at the left end edge (rear edge part of the movement) of the black pattern becomes apparent in some sort of tailing phenomenon in which the pixel is not varied to a white pixel due to occurrence of a reverse tilt domain.

In addition, in the liquid crystal panel 100, when a region of the black pixels where white pixels are a background moves by two pixels for each frame, this tailing phenomenon does not become apparent (or is unlikely to be visually recognized) if a response time of the liquid crystal element is shorter than a time interval (that is, one frame period) when a display image is updated. This reason may be considered as follows. In other words, this is because it is considered that, when a white pixel and a black pixel are adjacent to each other in a certain frame, a reverse tilt domain may occur in the white pixel, but, if a movement of an image is considered, pixels in which the reverse tilt domain occurs are discrete, and thus the tailing phenomenon is not visible.

Figure 27:
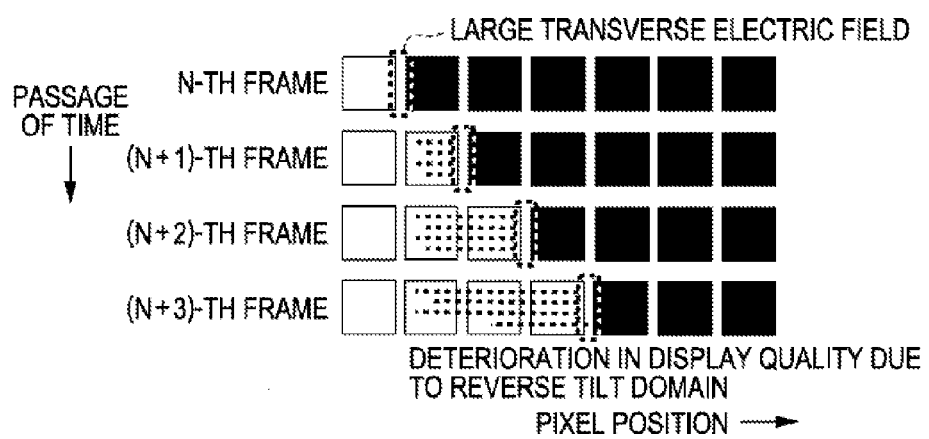
FIG. 27 is a diagram illustrating display defects and the like due to influence of a transverse electric field.

In addition, in a reverse viewpoint of FIG. 27, in a case where a white pattern in which white pixels are continuously located is moved to the right by one pixel for each frame as a background of black pixels, a pixel which is to be varied from the black pixel to the white pixel at the right end edge (front edge part of the movement) is not varied to a white pixel due to occurrence of a reverse tilt domain. In addition, in FIG. 27, for convenience of description, the boundary vicinity of one line is extracted from an image.

One of causes of the display defects due to the reverse tilt domain may be that the liquid crystal molecules interposed in the liquid crystal element 120 are disarrayed due to influence of a transverse electric field when the liquid crystal molecules are in an unstable state, and, then, an alignment state corresponding to an applied voltage is unlikely to happen.

Here, the case of being influenced by the transverse electric field is a case where a potential difference between pixels adjacent to each other increases, and this is a case where a dark pixel in a black level (or close to a black level) and a bright pixel in a white level (or close to a white level) are adjacent to each other in an image to be displayed.

Of them, the dark pixel refers to a pixel of the liquid crystal element 120 to which an applied voltage is in a voltage range A equal to or more than a voltage Vbk of the black level in the normally black mode and lower than a threshold value Vth1 (first voltage). In addition, for convenience, a transmittance range (grayscale range) of a liquid crystal element in which an applied voltage to the liquid crystal element is in the voltage range A is indicated by "a".

Next, the bright pixel refers to a pixel of the liquid crystal element 120 to which an applied voltage is in a voltage range B equal to or more than a threshold value Vth2 (second voltage) and equal to or less than a white level voltage Vwt in the normally black mode. In addition, for convenience, a transmittance range (grayscale range) of a liquid crystal element in which an applied voltage to the liquid crystal element is in the voltage range B is indicated by "b".

In addition, in the normally black mode, the threshold value Vth1 is an optical threshold voltage which sets a relative transmittance of the liquid crystal element to 10%, and the threshold value Vth2 is an optical saturation voltage which sets the relative transmittance of the liquid crystal element to 90%. However, the threshold value Vth1 and the threshold value Vth2 may be voltages which respectively correspond to different relative transmittances under the condition of Vth2>Vth1.

Figure 4B:
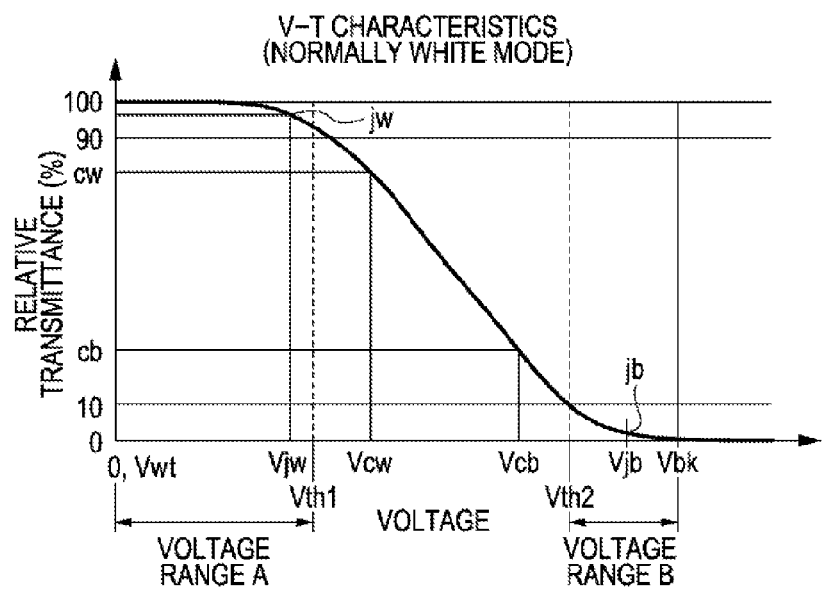

When the liquid crystal molecules are in an unstable state, an applied voltage to the liquid crystal element is lower than a judgment voltage Vjb (fifth voltage) shown in FIGS. 4A and 4B in the voltage range A. If an applied voltage to the liquid crystal element is lower than the judgment voltage Vjb, a regulating force of a longitudinal electric field by the applied voltage is smaller than a regulating force by the alignment layer, and thus an alignment state of the liquid crystal molecules is likely to be disarrayed by a negligible external factor. In addition, thereafter, when an applied voltage becomes equal to or more than Vjb, even though the liquid crystal molecules are to be tilted according to the applied voltage, a response takes time. Conversely, when the applied voltage becomes equal to or more than the judgment voltage Vjb, the liquid crystal molecules start to be tilted (a transmittance starts to vary) according to the applied voltage, and thus it can be said that the an alignment state of the liquid crystal molecules is in a stable state. For this reason, the judgment voltage Vjb is lower than the threshold value Vth1 regulated by a transmittance.

A grayscale level of a video signal which regulates the judgment voltage Vjb as an applied voltage to the liquid crystal element 120 is referred to as a judgment level jb.

Therefore, the video processing circuit 30 provided in the front stage of the liquid crystal panel 100 analyzes an image represented by the video signal Vid-in, and detects whether or not a dark pixel in the grayscale range a and a bright pixel in the grayscale range b are adjacent to each other. In addition, if a grayscale level of the dark pixel adjacent to a boundary between the dark pixel and the bright pixel is lower than the judgment level jb, the video processing circuit 30 corrects the video signal of the dark pixel to a video signal with a correction level cb. The correction level cb is a grayscale level of a video signal which regulates a correction voltage Vcb (sixth voltage) as an applied voltage to the liquid crystal element 120. The judgment level jb is a grayscale level belonging to the grayscale range a. The correction level cb is a grayscale level equal to or higher than at least the judgment level jb, but, here, belongs to a grayscale range d which is higher than the grayscale range a and is lower than the grayscale range b.

Further, in the video processing circuit 30, in order to suppress occurrence of a reverse tilt domain by reducing a transverse electric field between a dark pixel and a bright pixel adjacent to each other, in a case where an applied voltage to a bright pixel adjacent to a dark pixel is higher than a judgment voltage "Vjw" (third voltage), a video signal is corrected such that the applied voltage to the bright pixel is set to a correction voltage "Vcw" (fourth voltage) which is equal to or less than the judgment voltage "Vjw". Hereinafter, a grayscale level of a video signal for regulating the judgment voltage "Vjw" is referred to as a judgment level "jw", and a grayscale level of a video signal for regulating the correction voltage "Vcw" is referred to as a judgment level "cw". The correction level cw is a grayscale which is equal to or less than the judgment level jw, but here it belongs to the grayscale level d.

Here, a description will be made of a relationship between a video signal Vid-in (FIG. 6A) and a video signal Vid-out (FIG. 6B) in quadruple normal speed driving. FIGS. 6A and 6B show pixels of an image of one line, and each rectangle corresponds to one pixel. Here, the pixel shown black is a dark pixel, and the pixel shown white is a bright pixel.

In FIG. 6B, in the video signal Vid-out corresponding to the video signal Vid-in, video signals Vid-out respectively corresponding to the first, second, third and fourth fields are shown in order from the top of the figure.

As shown in FIG. 6A, it is assumed that video signals Vid-in are supplied at supply speed of 60 Hz, and, the video signals Vid-in designate display of an image which scrolls and moves from the left to the right of the figure with the progress of a first frame, a second frame, and a third frame. In this case, when video signals Vid-out are output, there is a boundary at the same location during the entire one frame (that is, for 16.67 milliseconds) formed by first to fourth fields as shown in FIG. 6B. If there is the boundary at the same position for a long time, a poor alignment state of the liquid crystal molecules tends to be fixed as described above, and thus a reverse tilt domain is likely to occur in an adjacent pixel.

Therefore, in the present embodiment, the video processing circuit 30 corrects a video signal Vid-in which designates an applied voltage to the liquid crystal element 120 corresponding to a bright pixel higher than the judgment level Vjw among M (where M is an integer equal to or more than 1) pixels which are continuously located from a bright pixel adjacent to a boundary in an opposite direction to the boundary, to a video signal which designates the correction voltage Vcw lower than the judgment level Vjw by varying M in a correction period corresponding to one frame period. In addition, the video processing circuit 30 corrects a video signal Vid-in which designates an applied voltage to the liquid crystal element 120 corresponding to a dark pixel lower than the judgment level Vjb among N (where N is an integer equal to or more than 1) pixels which are continuously located from a dark pixel adjacent to a boundary in an opposite direction to the boundary, to a video signal which designates the correction voltage Vcb higher than the judgment level Vjb by varying N in a correction period corresponding to one frame period (that is, a display period corresponding to the video signal).

Figure 3:
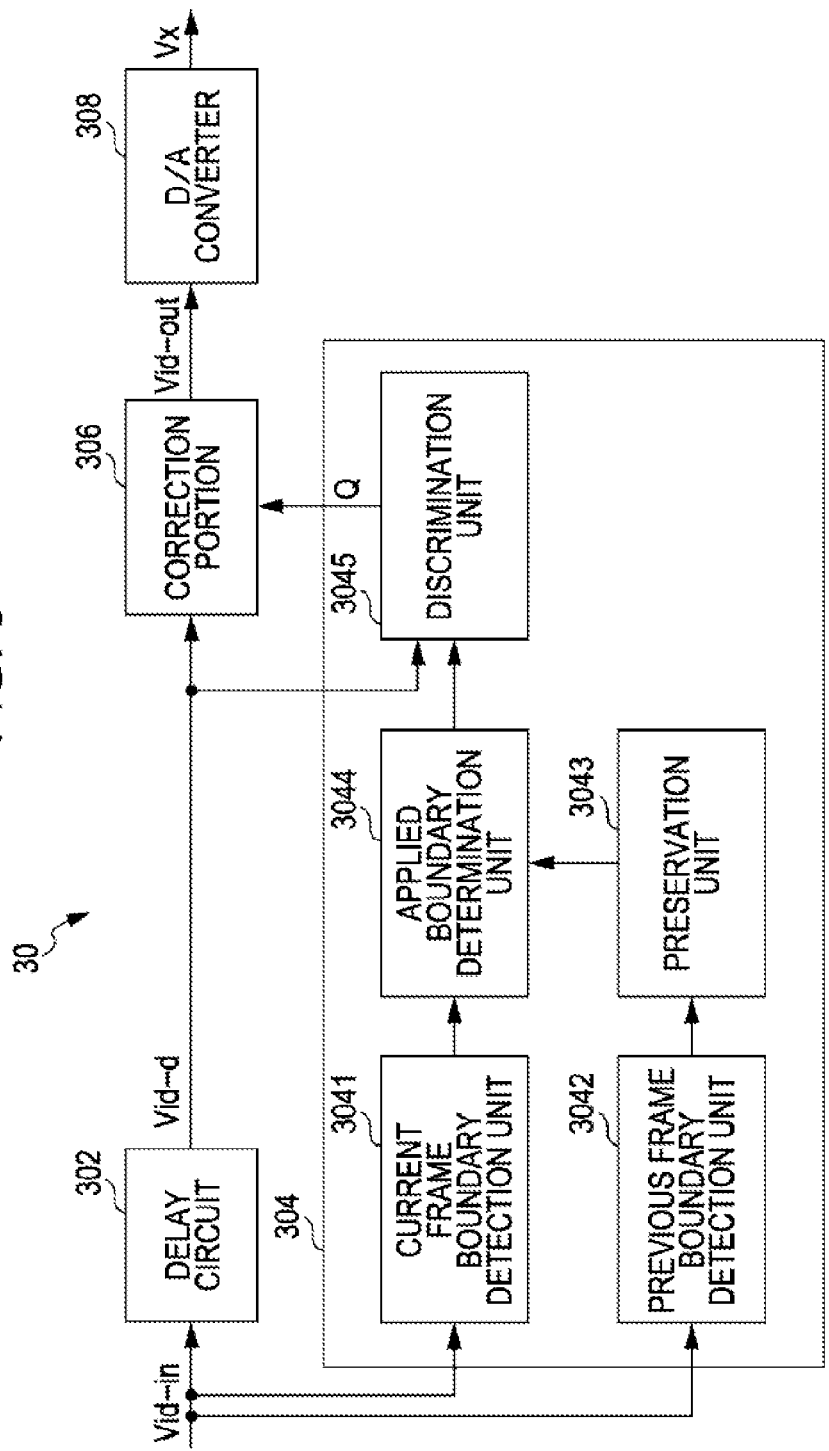
FIG. 3 is a diagram illustrating a configuration of the same video processing circuit.

The video processing circuit 30 in FIG. 3 is a circuit for preventing occurrence of the reverse tilt domain in the liquid crystal panel 100 in advance by processing a video signal Vid-in of a current frame based on this concept.

Next, details of the video processing circuit 30 will be described with reference to FIG. 3. As shown in FIG. 3, the video processing circuit 30 includes a delay circuit 302, a boundary detection portion 304, a correction portion 306, and a D/A converter 308.

The delay circuit 302 is constituted by a FIFO (First In First Out) memory, a multi-stage latch circuit, or the like, accumulates video signals Vid-in supplied from a high rank device, and reads the signals after a predetermined time has elapsed so as to be output as video signals Vid-d. In addition, the accumulation and reading in the delay circuit 302 are controlled by the scanning control circuit 20.

The boundary detection portion 304 includes a current frame boundary detection unit 3041, a previous frame boundary detection unit 3042, a preservation unit 3043, an applied boundary determination unit 3044, and a discrimination unit 3045.

The current frame boundary detection unit 3041 analyzes an image represented by a video signal Vid-in of a current frame and discriminates whether or not there is a part where a dark pixel in the grayscale range a and a bright pixel in the grayscale range b are adjacent to each other. In addition, when it is discriminated that there is an adjacent part, the current frame boundary detection unit 3041 detects a boundary which is the adjacent part and outputs position information of the boundary (first boundary detection unit).

The previous frame boundary detection unit 3042 analyzes an image represented by a video signal Vid-in of a previous frame and detects a part where a dark pixel and a bright pixel are adjacent as a boundary. The previous frame boundary detection unit 3042 performs a process of the same procedures as the current frame boundary detection unit 3041 on the basis of the video signal Vid-in, so as to detect a boundary, and outputs position information of the detected boundary.

The preservation unit 3043 preserves the position information of the boundary detected by the previous frame boundary detection unit 3042 so as to be delayed by one frame period and be output.

Therefore, the boundary detected by the current frame boundary detection unit 3041 is related to the current frame, whereas the boundary which is detected by the previous frame boundary detection unit 3042 and is preserved in the preservation unit 3043 is related to the previous frame. That is to say, the previous frame boundary detection unit 3042 detects a boundary between the dark pixel and the bright pixel in the input video signal of the previous frame (second boundary detection unit).

The applied boundary determination unit 3044 determines a boundary which is obtained by excluding the same boundary as the boundary of the previous frame preserved in the preservation unit 3043 among boundaries of the current frame detected by the current frame boundary detection unit 3041, as an applied boundary. In other words, the applied boundary is a boundary which varies from the previous frame to the current frame, that is, is not present in the previous frame and is present in the current frame.

In a case where the discrimination unit 3045 discriminates whether or not a pixel represented by the video signal Vid-d which is delayed and is output is a bright pixel adjacent to an applied boundary determined by the applied boundary determination unit 3044 and a grayscale level thereof is higher than the judgment level jw corresponding to an adjacent bright pixel, and the discrimination result is "YES", a flag Q of an output signal is output as "1". In addition, in a case where the discrimination unit 3045 discriminates whether or not a pixel represented by the video signal Vid-d is a dark pixel adjacent to an applied boundary determined by the applied boundary determination unit 3044 and a grayscale level thereof is lower than the judgment level jb corresponding to an adjacent bright pixel, and the discrimination result is "YES", the flag Q of an output signal is output as "1". On the other hand, in a case where the discrimination unit 3045 discriminates that a grayscale level of a bright pixel adjacent to the applied boundary is equal to or lower than the judgment level jw corresponding to an adjacent dark pixel, discriminates that a grayscale level of a dark pixel adjacent to the applied boundary is equal to or higher than the judgment level jb corresponding to an adjacent dark pixel, and discriminates that the pixel is neither a dark pixel nor a bright pixel adjacent to the applied boundary, the discrimination unit 3045 outputs the flag Q of an output signal as "0".

In addition, the current frame boundary detection unit 3041 cannot detect a boundary in the vertical direction or horizontal direction unless video signals are accumulated to a degree (at least three or more rows). This is also the same for the previous frame boundary detection unit 3042. For this reason, the delay circuit 302 is provided in the meaning of adjusting supply timing of the video signal Vid-in from the higher rank device.

The above description relates to the configuration of the boundary detection portion 304.

Figure 7A:
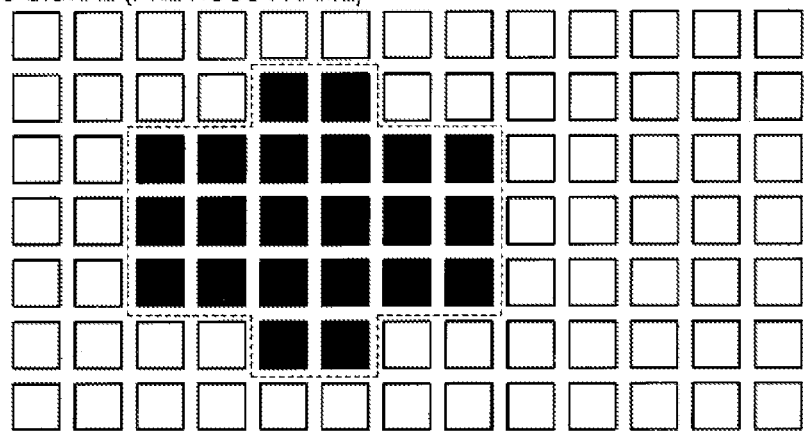
FIGS. 7A to 7C are diagrams illustrating boundary detection procedures in the same video processing circuit.
Figure 7B:
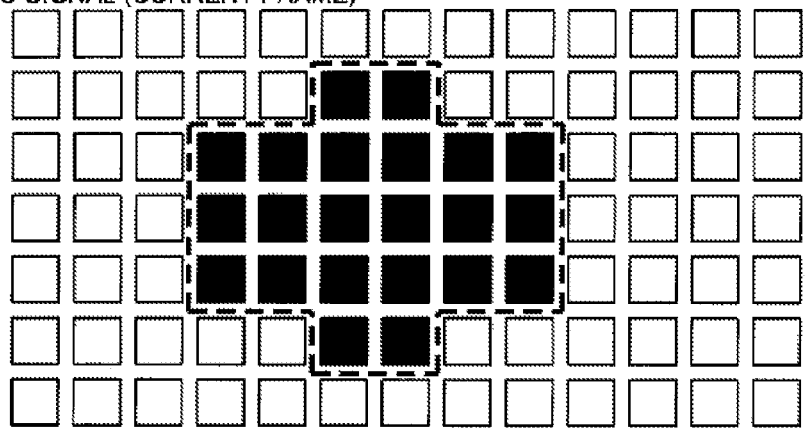
Figure 7C:
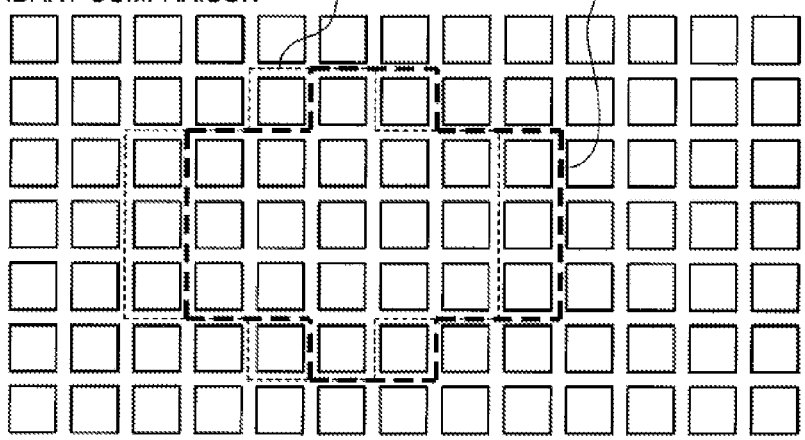
Figure 8:
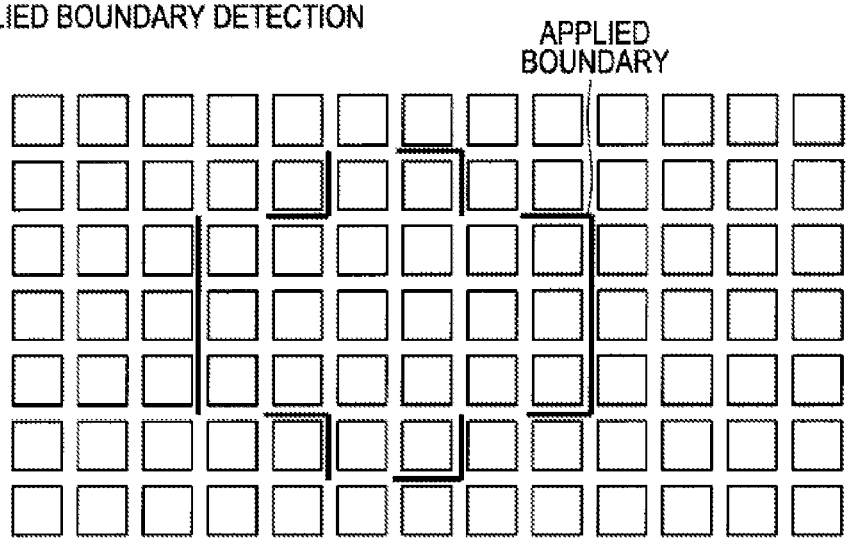
FIG. 8 is a diagram illustrating boundary detection procedures in the same video processing circuit.

In a case where an image represented by the video signal Vid-in of a previous frame is, for example, as shown in FIG. 7A, and an image represented by the video signal Vid-in of a current frame is, for example, as shown in FIG. 7B, boundaries in the images represented by the respective video signals Vid-in are as shown in FIG. 7C. In addition, a boundary which does not overlap boundaries detected by the previous frame boundary detection unit 3042 among boundaries detected by the current frame boundary detection unit 3041 is determined as an applied boundary by the applied boundary determination unit 3044. Therefore, an applied boundary in this case is as shown in FIG. 8.

In a case where the flag Q supplied from the discrimination unit 3045 is "1", the correction portion 306 corrects a video signal Vid-d so as to be output as a video signal Vid-out. As shown in FIGS. 9A and 9B, specifically, when the flag Q is "1", the correction portion 306 corrects a video signal of a bright pixel of which a grayscale level is higher than the judgment level jw among M pixels (here, two pixels) which are continuously located from the bright pixel adjacent to the applied boundary in an opposite direction to the applied boundary, to a video signal with the correction level cw in the first and third fields of one frame period. In addition, the correction portion 306 corrects a video signal of a bright pixel of which a grayscale level is higher than the judgment level jw among M pixels (here, four pixels) which are continuously located from the bright pixel adjacent to the applied boundary in an opposite direction to the applied boundary, to a video signal with the correction level cw in the second and fourth fields of one frame period. Further, when the flag Q is "1", the correction portion 306 corrects a video signal of a dark pixel of which a grayscale level is lower than the judgment level jb among N pixels (here, three pixels) which are continuously located from the dark pixel adjacent to the applied boundary in an opposite direction to the applied boundary, to a video signal with the correction level cb in the first and third fields of one frame period. Furthermore, the correction portion 306 corrects a video signal of a dark pixel of which a grayscale level is lower than the judgment level jb among N pixels (here, five pixels) which are continuously located from the dark pixel adjacent to the applied boundary in an opposite direction to the applied boundary, to a video signal with the correction level cb in the second and fourth fields of one frame period.

On the other hand, when the flag Q is "0", the correction portion 306 outputs the video signal Vid-d as the video signal Vid-out without correcting the video signal.

In addition, a dark pixel in which a longitudinally and transversely continuous boundary is positioned at a certain corner of the dark pixel, or a bright pixel in which a longitudinally and transversely continuous boundary is positioned at a certain corner of the bright pixel is also regarded as "being adjacent to a boundary". This is aimed at handling a case where an image moves by one pixel in a tilt direction. On the other hand, a dark pixel in which a boundary is positioned only in the longitudinal direction or transverse direction at one corner of the dark pixel or a bright pixel in which a boundary is positioned only in the longitudinal direction or transverse direction at one corner of the bright pixel is not regarded as being adjacent to the boundary since a longitudinally and transversely continuous boundary is not positioned.

The D/A converter 308 converts the video signal Vid-out which is digital data into an analog data signal Vx. In the present embodiment, since the surface inversion method is employed, a polarity of the data signal Vx is switched for one scene in the liquid crystal panel 100.

Next, a display operation of the liquid crystal display apparatus 1 will be described. The video signal Vid-in is supplied from the high rank device in order of the pixels of the first row and the first column to the first row and the n-th column, the second row and the first column to the second row and the n-th column, the third row and the first column to the third row and the n-th column, . . . , and the m-th row and the first column to the m-th row and the n-column, during one frame. The video processing circuit 30 performs processes such as delay and correction on the video signal Vid-in so as to be output as the video signal Vid-out.

Here, in a horizontal effective scanning period (Ha) when the video signals Vid-out of the first row and the first column to the first row and the n-th column are output, the processed video signals Vid-out are converted into positive or negative data signals Vx by the D/A converter 308 as shown in FIG. 5B. Here, for example, conversion into a positive data signal is performed in the first field. This data signals Vx are sampled in the first to n-th data lines 114 as data signals X1 to Xn by the data line driving circuit 140.

On the other hand, during the horizontal scanning period when the video signals Vid-out of the first row and the first column to the first row and the n-th column are output, the scanning control circuit 20 controls the scanning line driving circuit 130 such that only the scanning signal Y1 is in an H level. When the scanning signal Y1 is in an H level, the TFTs 116 of the first row are turned on, and thus the data signals sampled in the data lines 114 are applied to the pixel electrodes 118 via the turned-on TFTs 116. Thereby, positive voltages which respectively correspond to the video signals Vid-out are written in the liquid crystal elements of the first row and the first column to the first row and the n-th column.

Successively, video signals Vid-in of the second row and the first column to the second row and the n-th column are processed by the video processing circuit 30 in the same manner so as to be output as video signals Vid-out which are converted into positive data signals by the D/A converter 308 and are then sampled in the first to n-th data lines 114 by the data line driving circuit 140.

During the horizontal scanning period when the video signals Vid-out of the second row and the first column to the second row and the n-th column are output, since only the scanning signal Y2 is turned to an H level by the scanning line driving circuit 130, the data signals sampled in the data lines 114 are applied to the pixel electrodes 118 via the turned-on TFTs 116 of the second row. Thereby, positive voltages which respectively correspond to the video signals Vid-out are written in the liquid crystal elements of the second row and the first column to the second row and the n-th column.

Hereinafter, the same writing operation is performed on the third, fourth, . . . , and the m-th rows, and thereby voltages corresponding to grayscale levels designated by the video signals Vid-out are written in the respective liquid crystal elements such that a transmissive image regulated by the video signals Vid-in is created.

In the next field, the same writing operation is performed except that the video signal Vid-out is converted into a negative data signal according to polarity inversion of the data signal.

FIG. 5B is a voltage waveform diagram illustrating an example of the data signal Vx of the first and second fields when the video signals Vid-out of the first row and the first column to the first row and the n-th column are output from the video processing circuit 30 during the horizontal scanning period (H). Since the normally black mode is employed in the present embodiment, the data signal Vx becomes a high potential side voltage (indicated by the upward arrow in FIG. 5B) corresponding to a grayscale level processed by the video processing circuit 30 with respect to the reference voltage Vcnt in a positive polarity, and becomes a low potential side voltage (indicated by the downward arrow in FIG. 5B) corresponding to a grayscale level with respect to the reference voltage Vcnt in a negative polarity.

Specifically, a voltage of the data signal Vx becomes a voltage deviated from the reference voltage Vcnt a range from the voltage Vw(+) corresponding to white to the voltage Vb(+) corresponding to black in a positive polarity, and becomes a voltage deviated from the reference voltage Vcnt a range from the voltage Vw(−) corresponding to white to the voltage Vb(−) corresponding to black in a negative polarity.

The voltage Vw(+) and the voltage Vw(−) are symmetric to each other with respect to the voltage Vcnt. The voltage Vb(+) and the voltage Vb(−) are also symmetric to each other with respect to the voltage Vcnt.

In addition, FIG. 5B shows a voltage waveform of the data signal Vx which is different from a voltage (a potential difference between the pixel electrode 118 and the common electrode 108) applied to the liquid crystal element 120. Further, the longitudinal scale of the voltage of the data signal in FIG. 5B is enlarged as compared with the voltage waveform of the scanning signal and the like in FIG. 5A.

The above-described video processing circuit 30 of the first embodiment corrects a video signal to a video signal of a correction pixel by varying the numbers M and N of correction pixels in one frame period. Thereby, as can be seen from FIGS. 9A and 9B, a boundary between a correction pixel and a non-correction pixel is not continuously present at the same position during one frame period with respect to each of the dark pixel and the bright pixel. Therefore, according to the video processing circuit 30, it is possible to suppress a reverse tilt domain from being generated in a non-correction pixel due to correction for reducing a reverse tilt domain generated between a dark pixel and a bright pixel adjacent to each other.

In addition, the video processing circuit 30 varies two or more pixels from before a variation in a case of varying M and N. This is based on findings in which, if a boundary between a correction pixel and a non-correction pixel varies by at least two pixels, an effect of dividing spatial connection of a reverse tilt domain becomes the maximum, thereby suppressing generation of a reverse tilt domain due to a transverse electric field occurring between the adjacent correction pixel and non-correction pixel. In addition, in the present embodiment, based on findings in which display contradiction is likely to be visible as the number of correction pixels becomes larger, the video processing circuit 30 sets the number M of correction pixels of bright pixels to be equal to or less than 4.

Modification Examples of First Embodiment

Modification Example 1 of First Embodiment

Although, in the above-described first embodiment, the correction portion 306 sets the number of correction pixels to be the same in the first and third fields, and sets the number of correction pixels to be the same in the second and fourth fields, a combination of the same number of correction pixels is not limited thereto. For example, as shown in FIGS. 10A and 10B, the correction portion 306 may set the number of correction pixels to be the same in the first and second fields and set the number of correction pixels to be the same in the third and fourth fields.

Modification Example 2 of First Embodiment

Although, in the first embodiment, the correction portion 306 corrects a video signal using all the fields of one frame period as a correction period, at least some of one frame period may be used as a correction period, and a video signal may not be corrected in the other period. For example, as shown in FIGS. 11A and 11B, the correction portion 306 may correct a video signal in the first and third fields, and may not correct the video signal in the second and fourth fields.

Modification Example 3 of First Embodiment

Although, in the first embodiment, the correction portion 306 sets a correction level of a bright pixel to cw and sets a correction level of a dark pixel to cb, each correction level may be dynamically varied. For example, as shown in FIGS. 12A and 12B, the correction portion 306 may correct a video signal of a bright pixel using a correction level w1 for increasing a grayscale level of the bright pixel before being corrected and correct a video signal of a dark pixel using a correction level b1 for increasing a grayscale level of the dark pixel before being corrected in the first and third fields, and may correct a video signal of a bright pixel using a correction level w2 for decreasing a grayscale level of the bright pixel before being corrected and correct a video signal of a dark pixel using a correction level b2 for decreasing a grayscale level of the dark pixel before being corrected in the second and fourth fields. As above, since the correction level w1 is a grayscale level which is higher than at least a grayscale level of the bright pixel before being corrected, and the correction level w2 is a grayscale level which is lower than at least a grayscale level of the bright pixel before being corrected, a relationship of w1>w2 is satisfied. Since the correction level b1 is a grayscale level which is higher than at least a grayscale level of the dark pixel before being corrected, and the correction level b2 is a grayscale level which is lower than at least a grayscale level of the dark pixel before being corrected, a relationship of b1>b2 is satisfied. In this way, if the correction portion 306 performs correction for making a grayscale level higher than that before being corrected and correction for making grayscale level lower than that before being corrected during one frame period, it is possible to suppress a variation in an integral value of a transmittance (integral transmittance) in one frame period due to the correction. In this way, it is possible to suppress a transmittance variation due to correction of a video signal from being perceived by a user.

In addition, the correction portion 306 may set three or more types of correction levels for each of a bright pixel and a dark pixel.

Modification Example 4 of First Embodiment

Although, in the first embodiment, the correction portion 306 varies the number of correction pixels for each of a bright pixel and a dark pixel, the number of correction pixels of either the bright pixel or the dark pixel may be varied. For example, as shown in FIGS. 13A and 13B, the correction portion 306 may set the number M of correction pixel of bright pixels to two or four, and may fix the number N of correction pixels of dark pixels to 3.

Modification Example 5 of First Embodiment

Although, in the first embodiment, the correction portion 306 alternately varies two types of pixel numbers such that the number M of correction pixels is set to 2 or 4, three or more types of pixel numbers may be sequentially varied. In addition, the correction portion 306 may set any number of uses of the same number M of correction pixels (two in the first embodiment) in one frame period. The correction portion 306 may set the number of uses of the same number M of correction pixels to three or more, and repeatedly vary the number M of correction pixels in one frame period. Similarly, the correction portion 306 may sequentially vary three or more types of pixel numbers with respect to the number N of correction pixels, and may set the number of uses of the same number N of correction pixels to three or more, and repeatedly vary the number N of correction pixels in one frame period. In addition, the correction portion 306 may set the number M of correction pixels to be the same as the number N of correction pixels in a portion of or entire one frame period, and may set the number N of correction pixels of dark pixels to be equal to or less than four.

Second Embodiment

Next, the second embodiment of the invention will be described.

The present embodiment is different from the first embodiment in that the video processing circuit 30 further narrows a correction target pixel in consideration of a tilt azimuth and a tilt angle of the liquid crystal molecules. First, a description will be made of grounds for taking into consideration a tilt azimuth and a tilt angle of the liquid crystal molecules.

As described above, it can be said that a pixel in which the liquid crystal molecules are unstable before a variation lies in circumstances in which a reverse tilt domain is likely to occur due to influence of a transverse electric field when a dark pixel and a bright pixel become adjacent to each other through movement of an image. However, if an examination is performed in consideration of an initial alignment state of the liquid crystal molecules, a reverse tilt domain may occur and may not occur depending on a positional relationship between a dark pixel and a bright pixel.

Figure 14A:
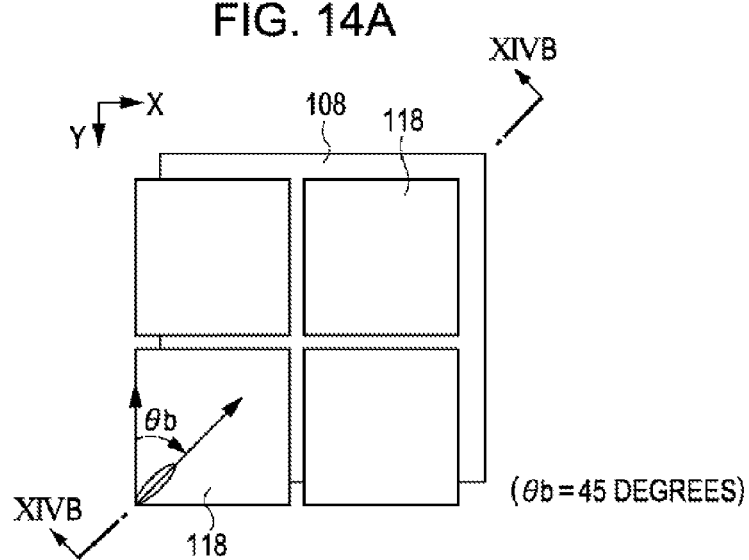
FIGS. 14A to 14C are diagrams illustrating an initial alignment when the same liquid crystal panel is of a VA type.
Figure 14B:
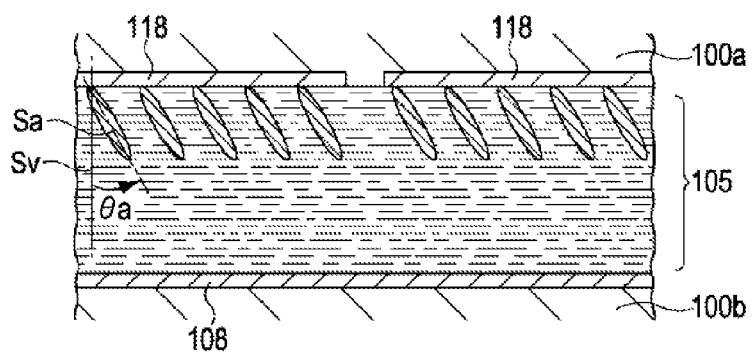

FIG. 14A is a diagram illustrating 2×2 pixels which are adjacent to each other in the longitudinal direction and transverse direction in the liquid crystal panel 100, and FIG. 14B is a simple cross-sectional view taken along the line XIVB-XIVB in the liquid crystal panel 100 of FIG. 14A.

Figure 14C:
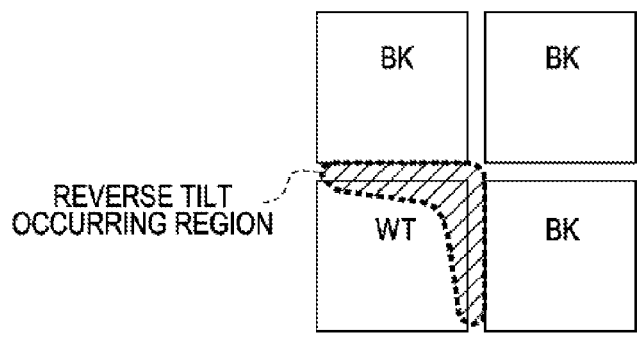

As shown in FIGS. 14A to 14C, the VA type liquid crystal molecules are initially aligned at a tilt angle θa and a tilt azimuth θb (=45 degrees) in a state in which a potential difference (an applied voltage to the liquid crystal element) between the pixel electrode 118 and the common electrode 108 is zero. Here, since a reverse tilt domain is caused by a transverse electric field between the pixel electrodes 118 as described above, behaviors of the liquid crystal molecules on the element substrate 100a side in which the pixel electrodes 118 are provided are problematic. For this reason, the tilt azimuth and the tilt angle of the liquid crystal molecules are regulated using the pixel electrode 118 (the element substrate 100a) side as a reference.

Specifically, the tilt angle θa is an angle formed by the major axis Sa of the liquid crystal molecule with respect to the substrate normal line Sv when one end on the pixel electrode 118 side is fixed and the other end on the common electrode 108 side is tilted in the major axis Sa of the liquid crystal molecule as shown in FIG. 14B.

Meanwhile, the tilt azimuth θb is an angle formed by a substrate vertical plane (a vertical plane including the line XIVB-XIVB) including the major axis Sa of the liquid crystal molecule and the substrate normal line Sv with respect to a substrate vertical plane in the Y direction which is an arrangement direction of the data lines 114. In addition, in relation to the tilt azimuth θb, in plan view from the pixel electrode 118 side to the common electrode 108, an angle in a direction (an upper right direction in FIG. 14A) toward the other end starting from one end of the major axis of the liquid crystal molecule from a screen upward direction (an opposite direction to the Y direction) is regulated as a clockwise direction.

In addition, similarly, in plan view from the pixel electrode 118 side, for convenience, a direction from one end on the pixel electrode side to the other end in the liquid crystal molecule is referred to as a downstream side of the tilt azimuth, and, for convenience, an opposite direction (a lower left direction in FIG. 14A) from the other end to one end is referred to as an upstream side of the tilt azimuth.

As disclosed in JP-A-2011-107174, in a case where a tilt azimuth θb is 45 degrees as shown in FIG. 14A in the VA type (normally black mode) liquid crystal, when only a self pixel varies to a bright pixel in a state in which the liquid crystal molecules are unstable in the self pixel and peripheral pixels, reverse tilt in the self pixel occurs in an inner circumferential region along the left side and the upper side as shown in FIG. 14C. Therefore, when attention is paid to a certain n-th frame, it can be said that a subsequent pixel is influenced by a reverse tilt domain in the n-th frame if the following conditions are satisfied. That is to say, reverse tilt occurs in a bright pixel in the n-th frame, (1) in a case where, when attention is paid to the n-th frame, a dark pixel and a bright pixel are adjacent to each other, that is, a pixel to which an applied voltage is low and a pixel to which an applied voltage is high are adjacent to each other and thus a transverse electric field is strengthened, (2) in a case where, in the n-th frame, the bright pixel (an applied voltage thereto is high) is located on the lower left side, the left side or the lower side corresponding to the upstream side of the tilt azimuth of the liquid crystal molecules with respect to the adjacent dark pixel (an applied voltage thereto is low), and (3) when the liquid crystal molecules of a pixel which varies to the bright pixel in the n-th frame have been unstable in the (n−1)-th frame one frame before.

As described above, in (2), when a boundary indicating a part where the dark pixel and the bright pixel are adjacent to each other moves by one pixel from a previous frame, it is considered that a reverse tilt domain more easily exerts an influence.

Figure 15:
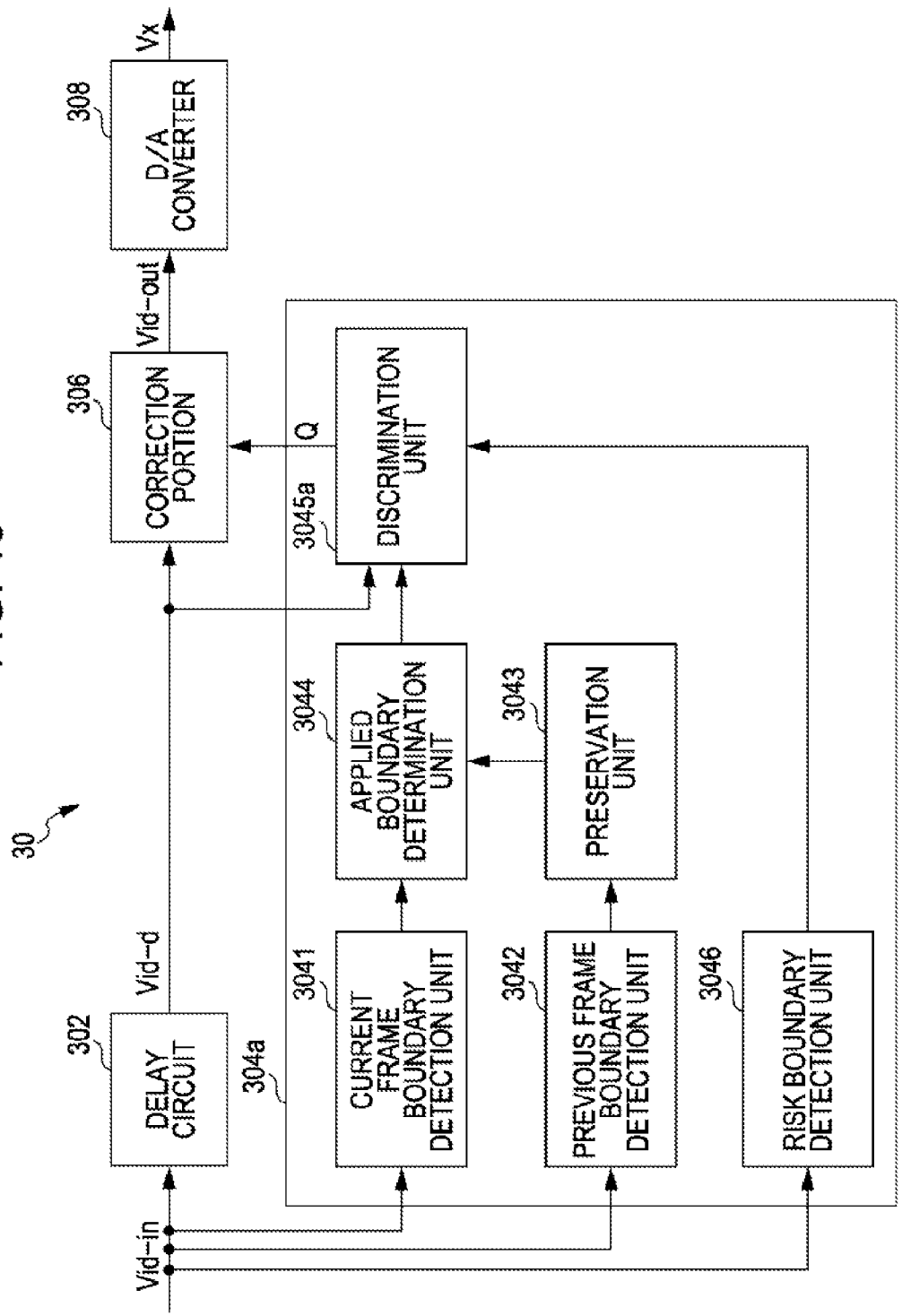
FIG. 15 is a diagram illustrating a configuration of a video processing circuit according to a second embodiment.
Figure 16A:
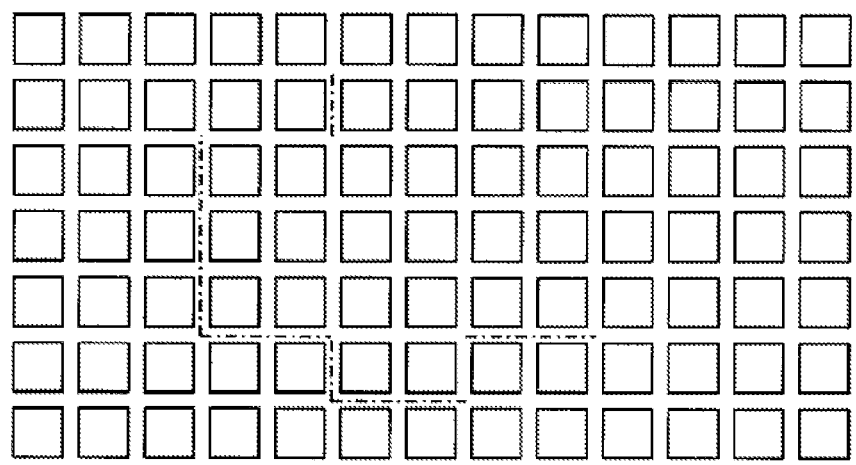
FIGS. 16A and 16B are diagrams illustrating boundary detection procedures in the same video processing circuit.
Figure 16B:
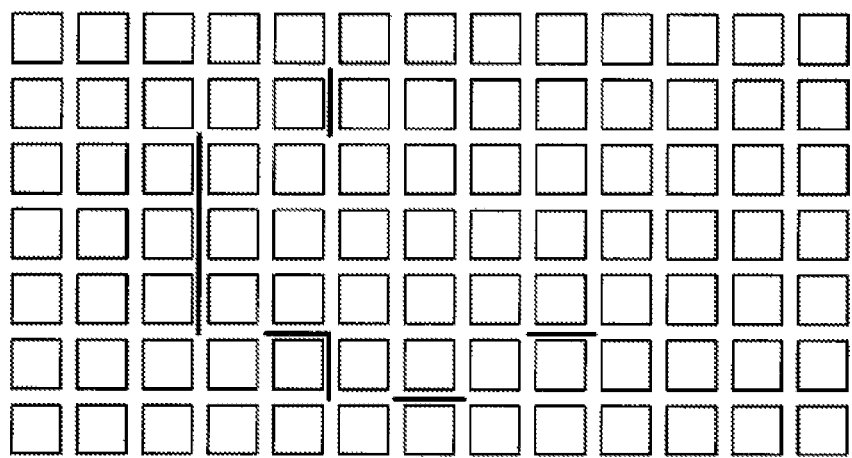

The video processing circuit 30 in FIG. 15 is a circuit for preventing occurrence of the reverse tilt domain in the liquid crystal panel 100 in advance by processing a video signal Vid-in of a current frame based on this concept.

Next, details of the video processing circuit 30 will be described with reference to FIG. 15. As shown in FIG. 15, the video processing circuit 30 includes a delay circuit 302, a boundary detection portion 304a, a correction portion 306, and a D/A converter 308. Among them, the delay circuit 302 and the D/A converter 308 realize functions equivalent to the configurations of the above-described first embodiment.

The boundary detection portion 304a includes a risk boundary detection unit 3046 in addition to the configuration of the boundary detection portion 304 of the first embodiment. The risk boundary detection unit 3046 analyzes an image represented by a video signal Vid-in of a current frame and discriminates whether or not there is a part where a dark pixel in the grayscale range a and a bright pixel in the grayscale range b are adjacent to each other in the vertical direction or horizontal direction. In addition, when it is discriminated that there is an adjacent part, the risk boundary detection unit 3046 extracts a part where the dark pixel is located on the upper side and the bright pixel is located on the lower side and a part where the dark pixel is located on the right side and the bright pixel is located on the left side, which are a portion of the adjacent part, detects the parts as a risk boundary, and outputs position information of the boundary. In this way, the risk boundary detection unit 3046 detects a risk boundary which is a part of the boundary between the dark pixel and the bright pixel and is defined by a tilt azimuth of the liquid crystal 105 (first boundary detection unit).

The discrimination unit 3045a discriminates whether or not a pixel which is represented by the delayed and output video signals Vid-d and is adjacent to a boundary which is a risk boundary detected by the risk boundary detection unit 3046 and is an applied boundary determined by the applied boundary determination unit 3044. The discrimination unit 3045a discriminates a correction pixel in the method described in the first embodiment based on a boundary which is a risk boundary and is also an applied boundary, and outputs an output signal. The discrimination unit 3045a is operated in the same manner as in the above-described first embodiment except for the above description.

The correction portion 306 is operated depending on a flag Q supplied from the discrimination unit 3045a in the same manner as in the above-described first embodiment (refer to FIGS. 9A to 13B).

Since, in the above-described second embodiment, the video processing circuit 30 sets a pixel adjacent to a boundary which is a risk boundary and is also an applied boundary as a correction pixel, it is possible to narrow pixels in which a reverse tilt domain is likely to occur so as to reduce the number of correction pixels, and to suppress occurrence of display defects due to the reverse tilt domain as compared with the first embodiment. In addition, according to the second embodiment, an effect equivalent to the above-described first embodiment can be achieved.

Modification Example of Second Embodiment

Although, in the second embodiment, a case where a tilt azimuth θb is 45 degrees in the VA type has been described as an example, the number of correction pixels can be further reduced than in the first embodiment even if other tilt azimuths θb are used as disclosed in JP-A-2011-107174. An example in which the tilt azimuth θb is 225 degrees will be described.

Figure 17A:
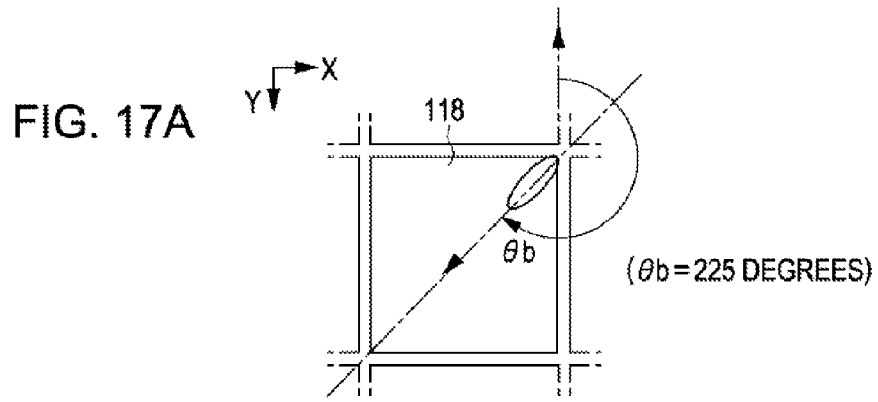
FIGS. 17A and 17B are diagrams illustrating that another tilt azimuth is used in the same liquid crystal panel.
Figure 17B:
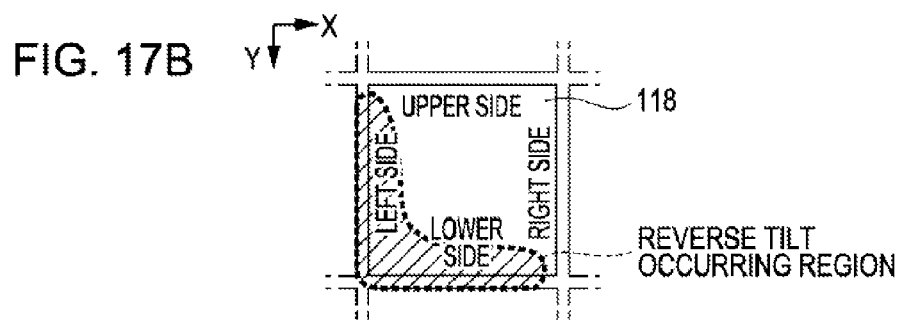

First, as shown in FIG. 17A, when only a self pixel varies to a bright pixel in a state in which the liquid crystal molecules are unstable in the self pixel and peripheral pixels, reverse tilt in the self pixel occurs in an inner circumferential region along the left side and the lower side as shown in FIG. 17B. Further, this example is equivalent to a case where rotation is performed by 180 degrees in the example, shown in FIGS. 14A to 14C, in which the tilt azimuth θb is 45 degrees.

In a case where the tilt azimuth θb is 225 degrees, among the conditions (1) to (3) in which a reverse tilt domain occurs in a case where the tilt azimuth θb is 45 degrees, the condition (2) is modified as follows. That is to say, the condition is modified to (2) in a case where, in the n-th frame, the bright pixel (an applied voltage thereto is high) is located on the upper right side, the right side or the upper side corresponding to the upstream side of the tilt azimuth of the liquid crystal molecules with respect to the adjacent dark pixel (an applied voltage thereto is low). In addition, the conditions (1) and (3) are not changed.

Therefore, if the tilt azimuth θb is 225 degrees, in a case where a dark pixel and a bright pixel are adjacent to each other, and the dark pixel is conversely located on the lower left side, the left side or the lower side with respect to the bright pixel, a measure is preferably taken about the liquid crystal element corresponding to the dark pixel such that the liquid crystal molecules do not become unstable.

For this reason, the correction portion 306 of the video processing circuit 30 may correct a video signal based on a risk boundary between a part where a dark pixel is located on the lower side and a bright pixel is located on the upper side and a part where a dark pixel is located on the left side and a bright pixel is located on the right side among boundaries which vary from a previous frame to a current frame.

Figure 19A:
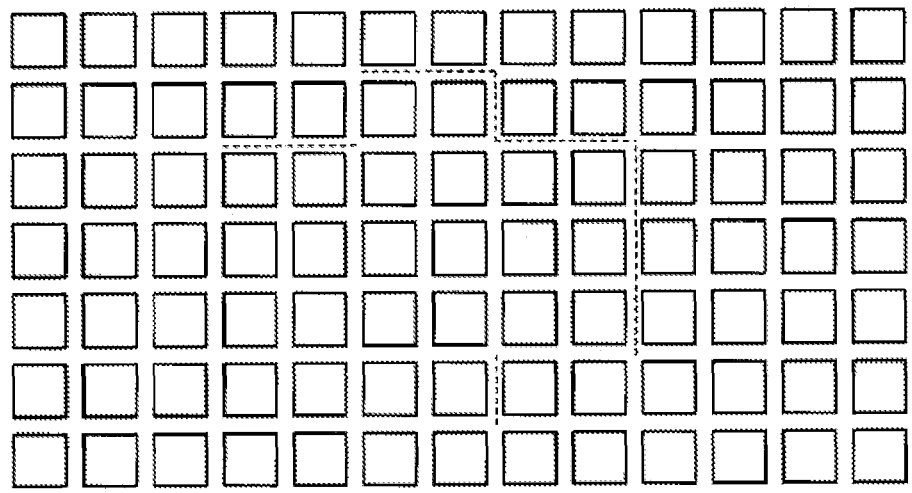
FIGS. 19A and 19B are diagrams illustrating risk boundary detection procedures in the same video processing circuit when another tilt azimuth is used.
Figure 20A:
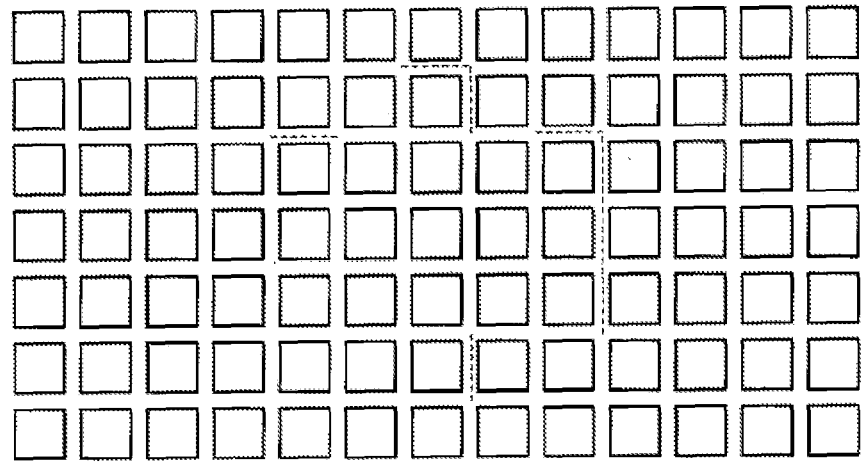
FIGS. 20A and 20B are diagrams illustrating boundary detection procedures in the same video processing circuit when another tilt azimuth is used.

Therefore, in a case where the tilt azimuth θb is 225 degrees, a risk boundary is detected as shown in FIG. 19A in an image varying from FIG. 7A to FIG. 7B. In addition, a boundary which is a risk boundary and is also an applied boundary is as shown in FIG. 20A.

Figure 18A:
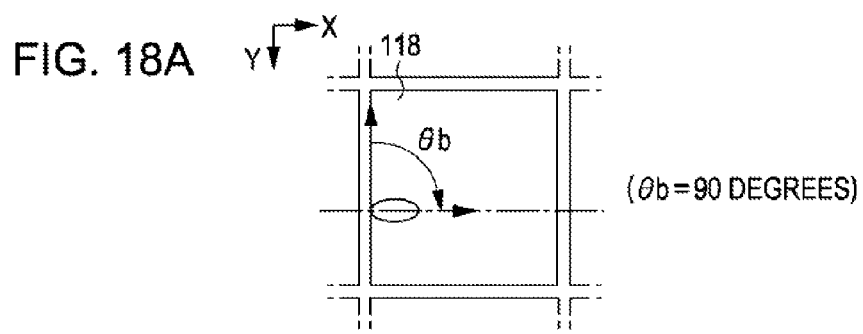
FIGS. 18A and 18B are diagrams illustrating that another tilt azimuth is used in the same liquid crystal panel.
Figure 18B:
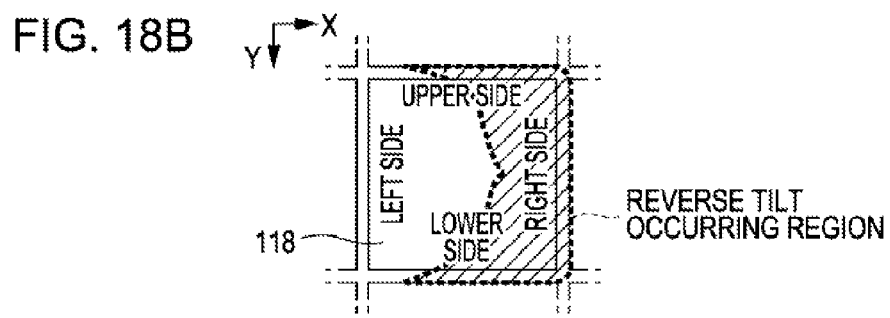

A description will be made of an example in which the tilt azimuth θb is 90 degrees as shown in FIG. 18A. In this example, when only a self pixel varies to a bright pixel in a state in which the liquid crystal molecules are unstable in the self pixel and peripheral pixels, reverse tilt in the self pixel intensively occurs in a region along the right side as shown in FIG. 18B. For this reason, it can be said that the reverse tilt domain also occurs in the rightish side of the upper side and in the rightish side of the lower side by a width with which the reverse tilt domain occurs in the right side.

In a case where the tilt azimuth θb is 90 degrees, among the conditions (1) to (3) in which a reverse tilt domain occurs in a case where the tilt azimuth θb is 45 degrees, the condition (2) is modified as follows. That is to say, the condition is modified to (2) in a case where, in the n-th frame, the bright pixel (an applied voltage thereto is high) is not only located on the left side corresponding to the upstream side of the tilt azimuth of the liquid crystal molecules but is also located on the upper side or the lower side influenced by a region occurring in the left side, with respect to the adjacent dark pixel (an applied voltage thereto is low). In addition, the conditions (1) and (3) are not changed.

Therefore, if the tilt azimuth θb is 90 degrees in the n-th frame, in a case where a dark pixel and a bright pixel are adjacent to each other, and the dark pixel is conversely located on the right side, the lower side or the upper side with respect to the bright pixel, a measure is preferably taken about the liquid crystal element corresponding to the dark pixel such that the liquid crystal molecules do not become unstable.

For this reason, the correction portion 306 of the video processing circuit 30 may correct a video signal based on a risk boundary between a part where a dark pixel is located on the right side and a bright pixel is located on the left side, a part where a dark pixel is located on the upper side and a bright pixel is located on the lower side, and a part where a dark pixel is located on the lower side and a bright pixel is located on the upper side among boundaries which vary from a previous frame to a current frame.

Figure 19B:
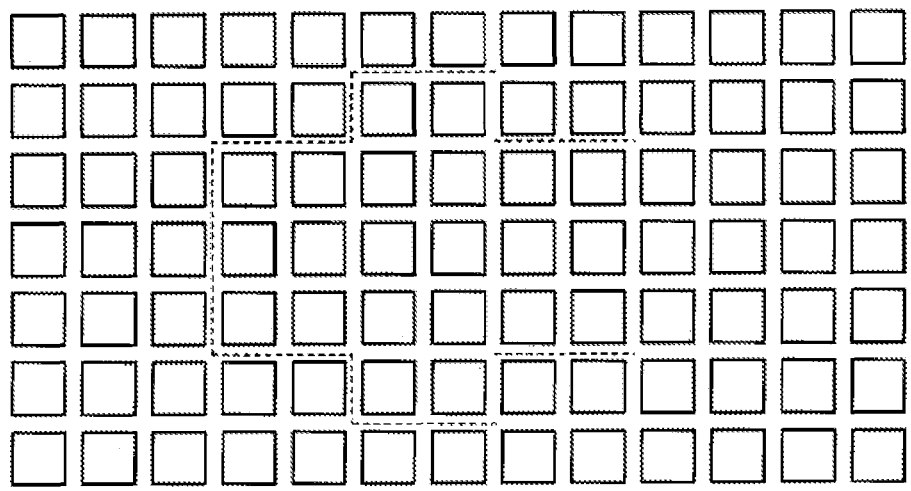
Figure 20B:
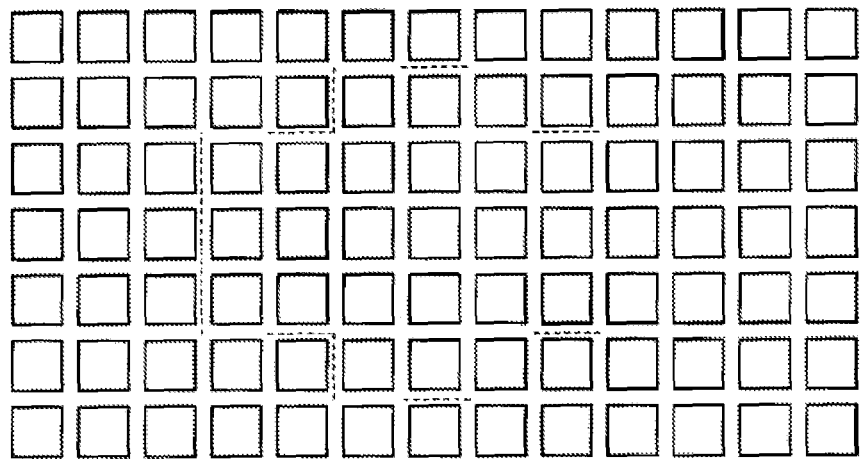

Therefore, in a case where the tilt azimuth θb is 90 degrees, a risk boundary is detected as shown in FIG. 19B in an image varying from FIG. 7A to FIG. 7B. In addition, a boundary which is a risk boundary and is also an applied boundary is as shown in FIG. 20B.

Third Embodiment

Next, the third embodiment of the invention will be described.

In the following description, the same constituent elements as in the first and second embodiments are given the same reference numerals, and description thereof will be appropriately omitted.

The video processing circuit 30 of the present embodiment detects boundaries where a dark pixel and a bright pixel are adjacent to each other in a current frame, sets a dark pixel adjacent to a boundary which moves from a previous frame to the current frame by one pixel as a correction target pixel, and does not set the other pixels as correction target pixels. As described above in the first embodiment with respect to FIG. 27, when a region of dark pixels where bright pixels are a background moves by two pixels for each frame, the tailing phenomenon does not become apparent (or is unlikely to be visually recognized). Therefore, if the video processing circuit 30 conditionally sets a pixel adjacent to the boundary which moves by one pixel as a correction target pixel, it is possible to further reduce the number of correction pixels.

Therefore, in this embodiment, the applied boundary determination unit 3044 determines only a boundary which moves by one pixel as an applied boundary, and does not determine a boundary which does not move from a previous frame and a risk boundary which moves by two or more pixels as an applied boundary, from a detection result of boundaries by the current frame boundary detection unit 3041 and the previous frame boundary detection unit 3042. Functions realized by the other units of the video processing circuit 30 are the same as in the first and second embodiments.

FIGS. 21A to 21C are diagrams illustrating a correction process of the present embodiment.

As shown in FIGS. 21A to 21C, an image varies from an image shown in FIG. 21A to an image shown in FIG. 21B, and, among boundaries which vary as shown in the figures from a previous frame to a current frame, the video processing circuit 30 defines a correction pixel based on a boundary which satisfies a movement condition of 1 pixel/frame as shown in FIG. 21C, and, does not define a correction pixel based on, for example, a boundary which moves by two pixels.

Thereby, the correction portion 306 can focus on and correct a location in which a reverse tilt domain is more likely to occur.

Fourth Embodiment

Next, the fourth embodiment of the invention will be described.

If correction target pixels increase, there is concern that display contradiction due to the correction target pixels may be visible. Therefore, in the present embodiment, a correction target pixel is defined as follows in consideration of movement of an image.

Figure 22A:
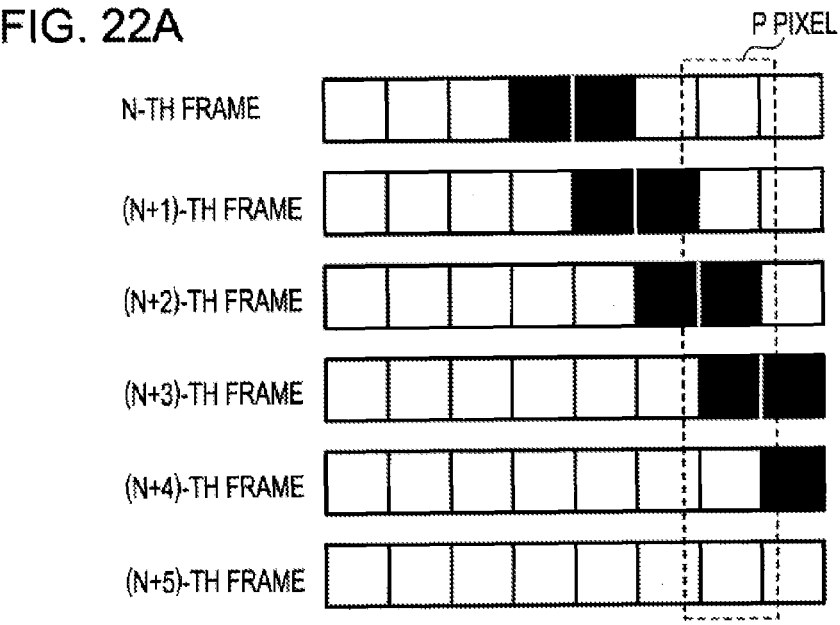
FIGS. 22A and 22B are diagrams illustrating a relationship between a movement of an image and a variation in a transmittance of a liquid crystal element.
Figure 22B:
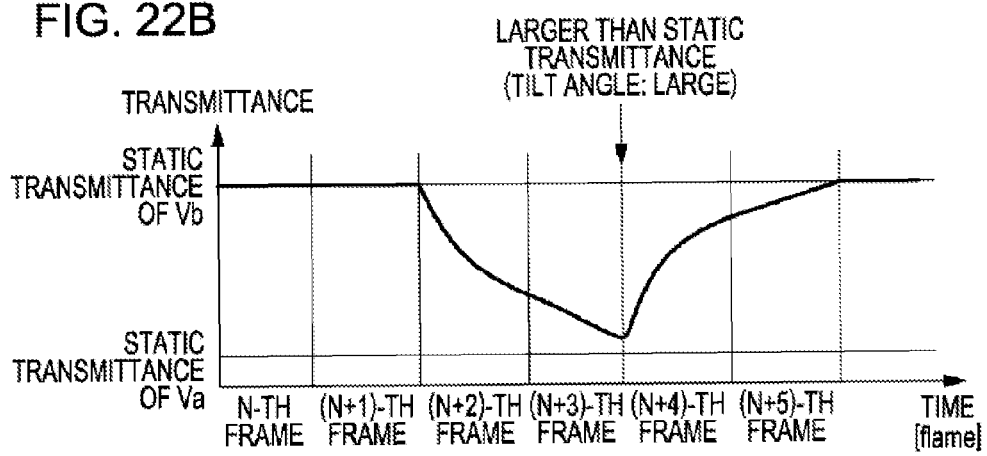
Figure 23A:
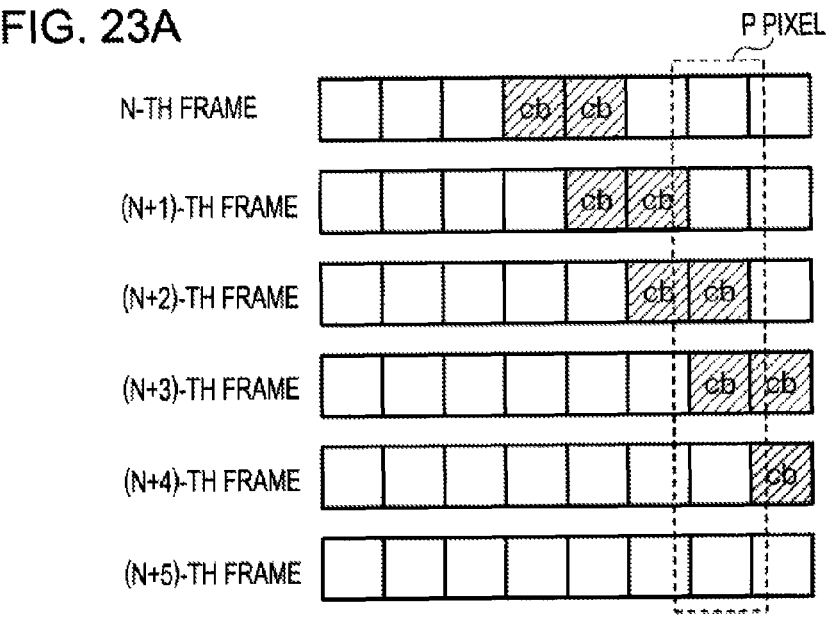
FIGS. 23A and 23B are diagrams illustrating a relationship between a movement of an image and a variation in a transmittance of a liquid crystal element.
Figure 23B:
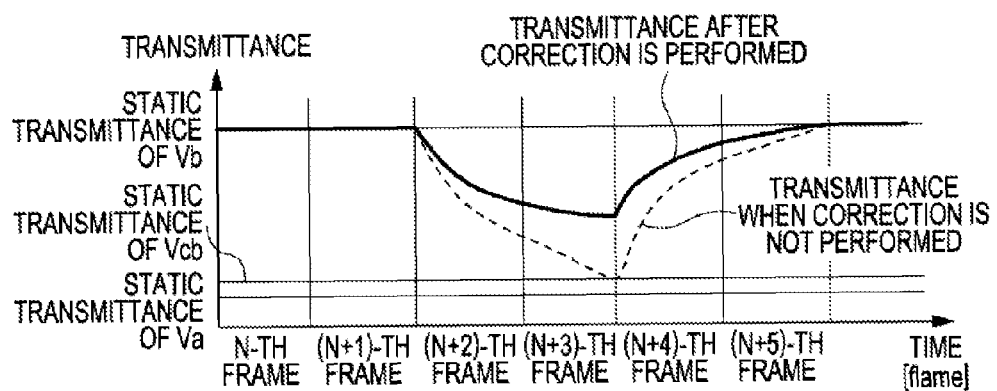
Figure 24A:
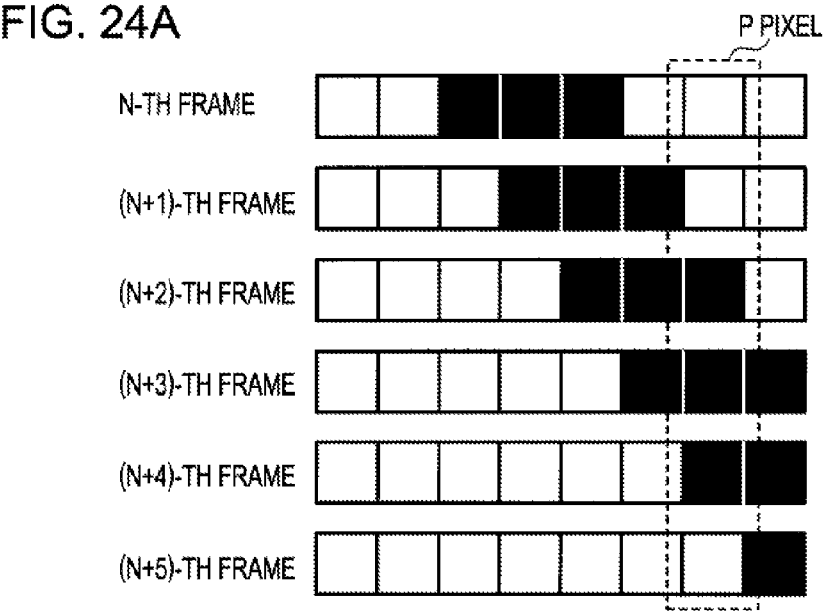
FIGS. 24A and 24B are diagrams illustrating a relationship between a movement of an image and a variation in a transmittance of a liquid crystal element.
Figure 24B:
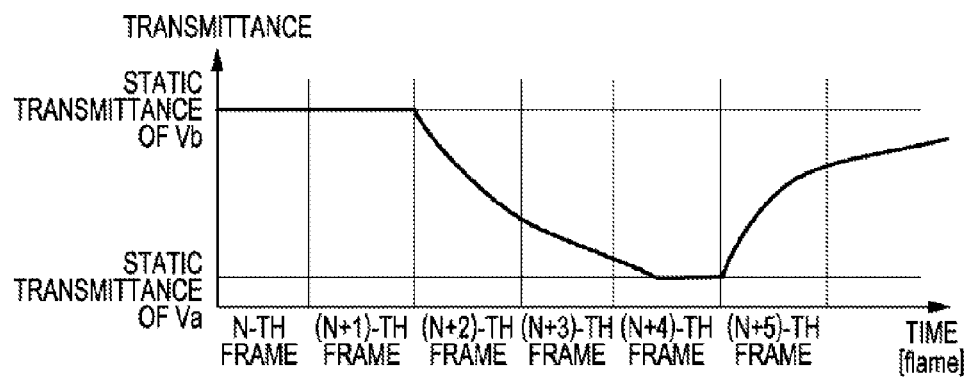

In FIGS. 22A to 24B, FIGS. 22A, 23A and 24A are diagrams illustrating a state in which an image moves from the N-th frame to the (N+5)-th frame in pixels of the image of one line, and FIGS. 22B, 23B and 24B are graphs illustrating a time-series variation of a transmittance of a pixel P located at the second position from the right in FIGS. 22A, 23A and 24A.

As shown in FIG. 22A, a case is considered in which a display pattern (here, a pattern of dark pixels of continuous two pixels having white pixels as a background) in which the number of continuous dark pixels is small moves at 1 pixel/frame. In this case, when attention is paid to the pixel P, a voltage Va in the grayscale range a is applied thereto in the (N+2)-th and (N+3)-th frames, and a voltage Vb in the grayscale range b is applied thereto in frames before and after the (N+2)-th and (N+3)-th frames. If a response speed of the liquid crystal is disregarded, the pixel P reaches a transmittance indicated by "static transmittance of Va" in FIG. 22B in the (N+2)-th and (N+3)-th frames. However, practically, as shown in FIG. 22B, the transmittance at an end point of the (N+3)-th frame is higher than the static transmittance when the voltage Va is applied. This is because an application period of the voltage Va is shorter that the response speed of the liquid crystal element. At this time, since the tilt angle of the liquid crystal is in a state of being larger than the pretilt angle, a reverse tilt domain is unlikely to occur even if a strong transverse electric field is applied to the dark pixel. Based on this concept, such a dark pixel is excluded for correction target pixels for reducing a reverse tilt domain in the present embodiment.

In addition, as shown in FIG. 22A, in a case where an applied voltage to this dark pixel is corrected to the correction voltage Vcb, since a response to a variation from the voltage Vb to the correction voltage Vcb is later than a response to a variation from the voltage Vb to the voltage Va, the transmittance of the correction target pixel is higher than that of an uncorrected pixel in the (N+2)-th and (N+3)-th frames as shown in FIG. 23B. As a result, a grayscale difference between the background of the white pixels and the pattern of the dark pixels is reduced, and thus a contrast ratio (moving image contrast) in the image is lower than that of an original image.

For the above-described reasons, it can be said that, even in a dark pixel adjacent to a bright pixel, correction for reducing a reverse tilt domain is not preferably performed on a dark pixel to which an application period of the voltage Va finishes before reaching the static transmittance when the voltage is applied. Here, a time interval when a display screen of the liquid crystal panel 100 is updated is indicated by S (milliseconds), and a response time of the liquid crystal element 120 when an applied voltage varies from a voltage higher than the threshold value Vth2 to a voltage lower than the threshold value Vth1 is indicated by T (milliseconds). In this case, if the response time T is 2.5×S, and an application period of the voltage Va is 2S, the liquid crystal element 120 does not reach the static transmittance as shown in FIG. 22B. On the other hand, if an application period of the voltage Va lasts for 3S or more, the liquid crystal element 120 reaches the static transmittance as shown in the (N+4)-th frame of FIG. 24B. Therefore, correction for reducing a reverse tilt domain is required in a case where dark pixels to which the voltage Va is applied are continuous three or more pixels, in order to suppress display defects when an image moves at 1 pixel/frame at which display defects are likely to be visible. On the other hand, the correction for reducing a reverse tilt domain is not required in a case where dark pixels to which the voltage Va is applied are continuous two or less pixels. To generalize, if the number of continuous dark pixels to be corrected is indicated by R (where R is an integer equal to or more than 2), the correction of these dark pixels are required in a case where the number R of continuous dark pixels is equal to or more than a value which is obtained by adding 1 to a value of an integer part of a value obtained by dividing the response time T by the time interval S. Therefore, in a case where R (where R is an integer equal to or more than 2) dark pixels are continuously located from a dark pixel adjacent to a boundary in an opposite direction to the boundary, the video processing circuit 30 may define a correction pixel based on this boundary and set the dark pixel as a correction pixel.

In addition, in relation to the response time T, for example, time until the liquid crystal element with a static transmittance when the voltage Vwt indicating the maximum grayscale of a bright pixel is applied reaches a static transmittance when a voltage (for example, the voltage Vbk indicating the minimum grayscale) lower than the threshold value Vth1 is applied may be examined in advance.

Figure 25A:
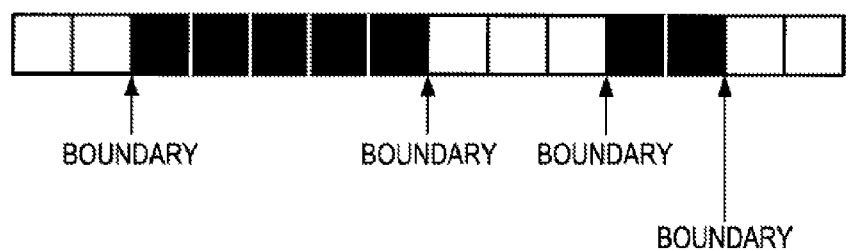
FIGS. 25A and 25B are diagrams illustrating a correction process in a video processing circuit according to a fourth embodiment.
Figure 25B:
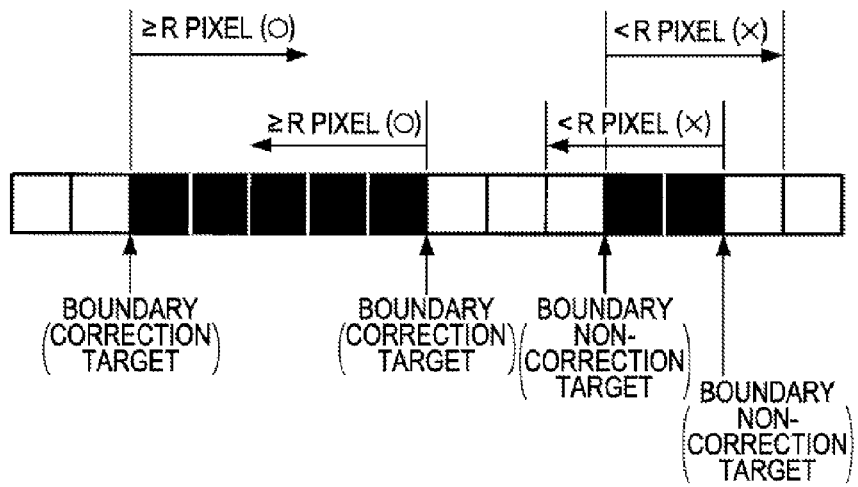

FIGS. 25A and 25B are diagrams illustrating an outline of a correction process by the video processing circuit 30 in a case where the response time T is 2.5×S.

In an image of one line as shown in FIG. 25A, pixels forming the image of one line are corrected as shown in FIG. 25B. Specifically, in a case where five dark pixels interposed between bright pixels from both sides are continuously arranged, since the number R (=5) of continuous dark pixels is equal to or more than a value (that is, 3) which is obtained by adding 1 to a value of an integer part of a value obtained by dividing the response time T by the time interval S, two dark pixels adjacent to the bright pixels are a correction target among the dark pixels and thus video signals thereof are corrected to video signals with a grayscale level cb. On the other hand, in a case where two dark pixels interposed between bright pixels from both sides are continuously arranged, since the number R (=2) of continuous dark pixels is less than a value (that is, 3) which is obtained by adding 1 to a value of an integer part of a value obtained by dividing the response time T by the time interval S, the dark pixels are not a correction target.

According to the above-described fourth embodiment, the video processing circuit 30 excludes, from correction target pixels, a dark pixel which does not arrive a static transmittance depending on the relationship between the response speed of the liquid crystal element and the update interval of the liquid crystal panel 100 when an image moves at 1 pixel/frame even in a dark pixel adjacent to an applied boundary. Thereby, the video processing circuit 30 can focus on and correct a dark pixel in which a reverse tilt domain is likely to occur in moving images, and thus can suppress occurrence of display contradiction such as reduction in moving image contrast due to correction of a video signal for reducing a reverse tilt domain.

MODIFICATION EXAMPLES

Modification Example 1

Although the video processing circuit 30 sets both of a dark pixel and a bright pixel as correction pixels in the above-described respective embodiments, either the bright pixel or the dark pixel may be set as a correction pixel.

Modification Example 2

In the respective embodiments, the video processing circuit 30 detects a boundary which varies from a previous frame to a current frame, and defines a correction pixel using a dark pixel adjacent to the detected boundary. The invention can be specified even if the video processing circuit 30 does not have constituent elements corresponding to the previous frame boundary detection unit 3042, the preservation unit 3043, and the applied boundary determination unit 3044. Even a configuration of this video processing circuit 30 can suppress generation of a reverse tilt domain in a non-correction pixel due to correction for reducing a reverse tilt domain.

Modification Example 3

Although an example in which the liquid crystal 105 employs the VA type has been described in the respective embodiments, a TN type may be employed. The reason thereof is the same as disclosed in JP-A-2011-107174.

Modification Example 4

In a case of correcting a video signal of a dark pixel, the correction portion 306 may correct the video signal of the dark pixel to a video signal with a grayscale level corresponding to the brightness of an image of the display region 101. For example, the correction portion 306 acquires information indicating the brightness of the display region 101, and performs correction such that the higher (that is, the brighter) the level of the brightness defined by the acquired information, the higher the grayscale level of a video signal after being corrected. This is because, since a variation in a grayscale due to the correction is unlikely to be visible as the display region 101 is brighter, display contradiction is unlikely to be perceived by a user even if a grayscale level after being corrected increases in order to prioritize reduction in a reverse tilt domain. There is the brightness (for example, illuminance) of peripheral video display surroundings of the display region 101 as the information indicating the brightness of the display region 101. In this case, the correction portion 306 may acquire a detection result from an optical sensor provided in the liquid crystal display apparatus 1, and the correction portion 306 may determine a corrected grayscale level. In addition, the correction portion 306 may acquire a grayscale level of an input video signal as the information (for example, an average value of grayscale levels of input video signals of one frame) indicating the brightness. This is because, as an image of video signals with higher grayscale levels is displayed, the display region 101 also becomes brighter. Further, the correction portion 306 may acquire mode information for designating any one of a plurality of video display modes which regulate the brightness or contrast ratio of an image displayed in the display region 101. The correction portion 306 uses a correction angle corresponding to the luminance or contrast ratio defined by a video display mode. In this case, the correction portion 306 may perform correction to a video signal with a grayscale level corresponding to a display mode in a state of increasing a grayscale level in order of a so-called dynamic mode, a normal mode and a power saving mode.

In addition, the correction portion 306 may acquire a detection result from a temperature sensor which detects peripheral temperature of the liquid crystal display apparatus 1 or temperature inside the liquid crystal display apparatus 1, and may determine a grayscale level of a video signal after being corrected according to temperature indicated by the detection result. Generally, since the transmittance of the liquid crystal element increases as temperature becomes higher, the correction portion 306 may perform correction to a video signal with a grayscale corresponding to temperature so as to reduce temperature dependency of a transmittance.

In addition, in relation to a method of determining a video signal after being corrected (an applied voltage to the liquid crystal element 120), the correction portion 306 may have a configuration in which calculation is performed using an arithmetic expression or may have a configuration in which a lookup table is referred to.

Modification Example 5

In addition, the video processing circuit 30 of the present embodiment is not limited to quadruple speed driving, and is applicable to a liquid crystal display apparatus employing speed driving such as, for example, double speed driving or eight times speed driving. Further, the video processing circuit 30 of the present embodiment is applicable to a liquid crystal display apparatus which does not employ the speed driving. For example, the video processing circuit may use at least some of display periods (for example, a plurality of frame periods) corresponding to video signals Vid-in of one scene as a correction period and may dynamically vary the number of correction pixels.

Modification Example 6

Although the video signal Vid-in designates a grayscale level of a pixel in the respective embodiments, the video signal Vid-in may directly designate an applied voltage to the liquid crystal element. In a case where the video signal Vid-in designates an applied voltage to the liquid crystal element, a boundary may be discriminated using a designated applied voltage, and a voltage may be corrected.

In addition, in the respective embodiments, the liquid crystal element 120 is not limited to a transmissive type and may be of a reflective type.

Electronic Equipment

Figure 26:
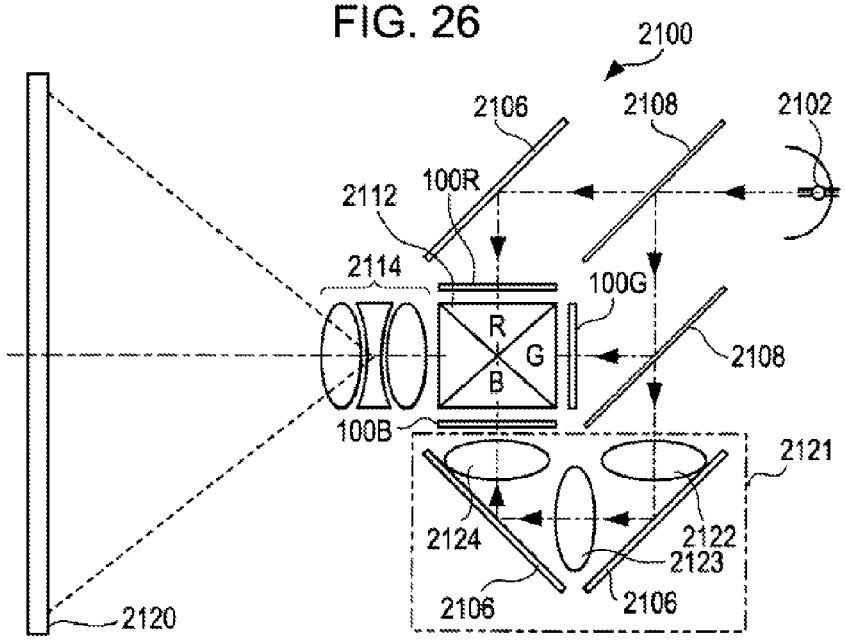
FIG. 26 is a diagram illustrating a projector which employs the liquid crystal display apparatus.

As an example of electronic equipment employing the liquid crystal display apparatus related to the above-described embodiments, projection type display equipment (projector) which uses the liquid crystal panel 100 as a light valve will be described. FIG. 26 is a plan view illustrating a configuration of the projector.

As shown in this figure, a lamp unit 2102 including a white light source such as a halogen lamp or the like is provided in the projector 2100. Projection light emitted from the lamp unit 2102 is divided into three primary colors of R (red), G (green), and B (blue), by three mirrors 2106 and two dichroic mirrors 2108 disposed therein, and is guided to light valves 100R, 100G and 100B corresponding to the respective primary colors. The light of B has a longer light path than that of R or G, and is thus guided to a relay lens system 2121 including a light-incident lens 2122, a relay lens 2123, and a light-exciting lens 2124 in order to prevent losses thereof.

In this projector 2100, three liquid crystal display apparatuses including the liquid crystal panel 100 are provided so as to respectively correspond to R, G, and B. Each of the light valves 100R, 100G and 100B has the same configuration as the above-described liquid crystal panel 100. A video signal corresponding to each primary color of R, G and B is supplied from an external high rank device, and the light valves 100R, 100G and 100B are respectively driven.

Light beams respectively modulated by the light valves 100R, 100G and 100B are incident to a dichroic prism 2112 from three directions. In this dichroic prism 2112, the light beams of R and B are refracted by 90 degrees, whereas the light of G travels straight. Thereby, images of the respective primary colors are combined, and then a color image is projected on a screen 2120 by a projection lens 2114.

Since the light beams respectively corresponding to R, G and B are incident to the light valves 100R, 100G and 100B by the dichroic mirror 2108, color filters are not required. In addition, the transmitted images from the light valves 100R and 100B are projected after reflected by the dichroic prism 2112, whereas the transmitted image from the light valve 100G is projected as it is, and thus the horizontal scanning direction by the light valves 100R and 100B is made to be reverse to the horizontal scanning direction by the light valve 100G, so as to display bilaterally inverted images.

As the electronic equipment, in addition to the projector described referring to FIG. 26, there are, for example, a television set, a view finder type/monitor direct view type video tape recorder, car navigation equipment, a pager, an electronic diary, an electronic calculator, a word processor, a workstation, a television-phone, a POS terminal, a digital still camera, a mobile phone, and equipment having a touch panel, and the like. Needless to say, the above-described liquid crystal display apparatus is applicable to the variety of electronic equipment.

This application claims priority to Japan Patent Application No. 2012-059884 filed Mar. 16, 2012, the entire disclosures of which are hereby incorporated by reference in their entireties.

What is claimed is:

1. A signal processing device which is used in a liquid crystal apparatus including a plurality of pixels, comprising:
   a detection portion that detects a boundary between a first pixel correlated with a first signal for applying a first voltage lower than a first reference voltage and a second pixel correlated with a second signal for applying a second voltage higher than a second reference voltage on the basis of a signal for controlling a voltage applied to each of the plurality of pixels; and
   a correction portion that corrects a signal correlated with M (where M is an integer equal to or more than 1) pixels including the first pixel to a third signal for applying a third voltage which is higher than the first voltage and lower than the second voltage in a correction period,
   wherein the correction portion varies M in the correction period.

2. The signal processing device according to claim 1, wherein the correction portion corrects the signal correlated with the M pixels including the first pixels to the third signal for applying the third voltage which is higher than the first voltage and lower than the second voltage in a correction period when the first voltage is lower than a third reference voltage which is lower than the first reference voltage.

3. The signal processing device according to claim 1, wherein the correction portion corrects a signal correlated with N (where N is an integer equal to or more than 1) pixels including the second pixel to a fourth signal for applying a fourth voltage which is higher than the first voltage and lower than the second voltage in a correction period, and
   wherein the correction portion varies N in the correction period.

4. A liquid crystal apparatus comprising the signal processing device according to claim 1.

5. Electronic equipment comprising the liquid crystal apparatus according to claim 4.

6. A signal processing device which is used in a liquid crystal apparatus including a plurality of pixels, comprising:
   a detection portion that detects a boundary between a first pixel correlated with a first signal for applying a first voltage lower than a first reference voltage and a second pixel correlated with a second signal for applying a second voltage higher than a second reference voltage on the basis of a signal for controlling a voltage applied to each of the plurality of pixels; and
   a correction portion that corrects a signal correlated with N (where N is an integer equal to or more than 1) pixels including the second pixel to a fourth signal for applying a fourth voltage which is higher than the first voltage and lower than the second voltage in a correction period,
   wherein the correction portion varies N in the correction period.

7. The signal processing device according to claim 6, wherein the correction portion corrects the signal correlated with N pixels including the second pixel to the fourth signal for applying the fourth voltage which is higher than the first voltage and lower than the second voltage in a correction period when the second voltage is higher than a fourth reference voltage which is higher than the second reference voltage.

8. The signal processing device according to claim 6, wherein the correction portion corrects a signal correlated with M (where M is an integer equal to or more than 1) pixels including the first pixel to a third signal for applying a third voltage which is higher than the first voltage and lower than the second voltage in a correction period, and
   wherein the correction portion varies M in the correction period.

9. A liquid crystal apparatus comprising the signal processing device according to claim 6.

10. Electronic equipment comprising the liquid crystal apparatus according to claim 9.

11. A signal processing device which is used in a liquid crystal apparatus including a plurality of pixels, comprising:
    a detection portion that detects a first signal, correlated with a first pixel, for applying a first voltage lower than a first reference voltage, and a second signal, correlated with a second pixel adjacent to the first pixel, for applying a second voltage higher than a second reference voltage on the basis of a signal for controlling a voltage applied to each of the plurality of pixels; and
    a correction portion that corrects a signal correlated with M (where M is an integer equal to or more than 1) pixels including the first pixel to a third signal for applying a third voltage which is higher than the first voltage and lower than the second voltage in a correction period,
    wherein the correction portion varies M in the correction period.

12. A liquid crystal apparatus comprising the signal processing device according to claim 11.

13. Electronic equipment comprising the liquid crystal apparatus according to claim 12.

14. A signal processing device which is used in a liquid crystal apparatus including a plurality of pixels, comprising:
    a detection portion that detects a first signal, correlated with a first pixel, for applying a first voltage lower than a first reference voltage, and a second signal, correlated with a second pixel adjacent to the first pixel, for applying a second voltage higher than a second reference voltage on the basis of a signal for controlling a voltage applied to each of the plurality of pixels; and
    a correction portion that corrects a signal correlated with N (where N is an integer equal to or more than 1) pixels including the second pixel to a fourth signal for applying a fourth voltage which is higher than the first voltage and lower than the second voltage in a correction period,
wherein the correction portion varies N in the correction period.

15. A liquid crystal apparatus comprising the signal processing device according to claim 14.

16. Electronic equipment comprising the liquid crystal apparatus according to claim 15.

17. A signal processing method of processing signals displayed in a liquid crystal apparatus including a plurality of pixels, comprising:
    detecting a boundary between a first pixel correlated with a first signal for applying a first voltage lower than a first reference voltage and a second pixel correlated with a second signal for applying a second voltage higher than a second reference voltage on the basis of a signal for controlling a voltage applied to each of the plurality of pixels; and
    correcting a signal correlated with M (where M is an integer equal to or more than 1) pixels including the first pixel to a third signal for applying a third voltage which is higher than the first voltage and lower than the second voltage in a correction period, and
    wherein the correcting of the signal includes varying M in the correction period.

* * * * *